United States Patent
Mihara

(12) 
(10) Patent No.: US 6,226,326 B1
(45) Date of Patent: May 1, 2001

(54) CODING DEVICE AND CODING METHOD

(75) Inventor: Kanji Mihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/368,550

(22) Filed: Aug. 5, 1999

Related U.S. Application Data

(63) Continuation of application No. PCT/JP98/05553, filed on Dec. 8, 1998.

(30) Foreign Application Priority Data

Dec. 8, 1997 (JP) ...................................... 9-336811

(51) Int. Cl.⁷ ...................................... H04N 7/26
(52) U.S. Cl. .................. 375/240.05; 375/240.07
(58) Field of Search .................. 375/240.03, 240.04, 375/240.05, 240.06, 240.07; H04N 7/26

(56) References Cited

U.S. PATENT DOCUMENTS

| | | | |
|---|---|---|---|
| 5,231,484 | * 7/1993 | Gonzales et al. | 375/240.04 |
| 5,619,341 | * 4/1997 | Auyeung et al. | 375/240.05 |
| 5,754,231 | * 5/1998 | Odaka et al. | 375/240.05 |
| 5,949,488 | * 9/1999 | Kim | 375/240.04 |
| 6,037,985 | * 3/2000 | Wong | 375/240.03 |
| 6,094,455 | * 7/2000 | Katta | 375/240.05 |
| 6,115,421 | * 9/2000 | Katta et al. | 375/240 |

FOREIGN PATENT DOCUMENTS 58-145284   8/1983   (JP) ................................. H04N/7/13

OTHER PUBLICATIONS

Kure et al., "D–344 Chikusekiyou gazou fuguoka ni okeru saiteki fugouryou seigyohou no kentou" Denshi Jouhou Tsuushin Gakkai Shuuki Taikai Kouen Rombunshuu, vol. 7, p. 86, 1992.

* cited by examiner

*Primary Examiner*—Howard Britton
(74) *Attorney, Agent, or Firm*—Frommer Lawrence & Haug, LLP.; William S. Frommer; Bruno Polito

(57) ABSTRACT

A video encoder for changing the bit rate at a halfway point in a GOP by using a TM5 (Test Model 5) bit rate control algorithm is provided. Using a bit quantity Rj(+1) allocated to non-coded pictures at and after a coding target picture (j+1), a target bit quantity T(j+1) allocated to the coding target picture (j+1) is calculated. In the case where pictures up to a picture (j) at a halfway point in a GOP are coded at a first bit rate and the picture (j+1) is coded at a second bit rate, the bit quantity R(j+1) allocated to non-coded pictures for calculating the target bit quantity R(j+1) is corrected to a bit quantity R(j+1) for non-coded pictures at the time when the pictures from a leading picture of the GOP are coded at the second bit rate. Thus, seamless bit rate change can be carried out at a halfway point in the GOP by using the fixed rate algorithm such as TM5.

39 Claims, 28 Drawing Sheets

IMAGE MULTIPLEXING SYSTEM 1

CODING DEVICE AND CODING METHOD

This is a continuation of copending International Application PCT/JP98/05553 having an international filing date of Dec. 8, 1998.

TECHNICAL FIELD

This invention relates to a coding device and a coding method, and particularly to a coding device and a coding method which enable seamless change of a bit rate at a halfway point in a GOP while using a rate change algorithm defined in TM5, and thus enable effective utilization of the capacity of a transmission line.

BACKGROUND ART

Recently, digital broadcasting for transmitting and receiving image data as digital data has been noted. An advantage of digital broadcasting is that a greater quantity of program data (hereinafter referred to as programs) can be transmitted on the same transmission line. This is considerably owing to the fact that image data can be compressed and transmitted. As a method for compressing image data, a bidirectionally predictive coding system employed in the MPEG (Moving Picture Experts Group) standard is often used. In this bidirectionally predictive coding system, three types of coding is carried out, that is, intra-frame coding, inter-frame forward predictive coding and bidirectionally predictive coding. Pictures of these coding types are called I-picture (intra coded picture), P-picture (predictive coded picture), and B-picture (bidirectionally predictive coded picture), respectively.

In compression coding of pictures in digital broadcasting, it is necessary to maintain high picture quality while restraining the data quantity (bit quantity) after compression coding to not more than the transmission capacity of the transmission line.

As a method for transmitting a greater number of programs to a transmission line of a predetermined transmission capacity, a technique of "statistical multiplexing" is known. The statistical multiplexing technique is a technique for dynamically changing the transmission rate of each program so as to transmit a greater number of programs. In this statistical multiplexing, transmission of a greater number of programs is made possible by reducing the transmission rate of a program such that deterioration in picture quality is imperceptible even when the transmission rate is reduced.

Referring to FIGS. 1 and 2, statistical multiplexing will be described further in detail. FIG. 1 shows an exemplary allocation bit rate for each program in the conventional case where multiplexing is carried out at a fixed rate. The vertical axis represents the allocation bit rate for each program and the horizontal axis represents the time. As shown in FIG. 1, the allocation bit rate of each program to be multiplexed such as weather forecast, news or drama remains constant from the bit rate allocated as an initial value, and does not vary with the lapse of time. The bit rate allocated to each program as the initial value is allocated so that deterioration in picture quality of a part (time) where deterioration in picture quality of each program is most perceptible falls within an allowable range. Therefore, a bit rate which is more than necessary is not allocated to parts except for the part where deterioration in picture quality is perceptible.

FIG. 2 shows an exemplary allocation bit rate for each program in the case where multiplexing is carried out by dynamically changing the allocation bit rate for each program using the statistical multiplexing technique. The vertical axis represents the allocation bit rate for each program and the horizontal axis represents the time. Statistical multiplexing utilizes the fact that a part (time) where deterioration in picture quality of each program is perceptible is rarely generated in the same time zone. That is, when deterioration in picture quality is perceptible in one program, deterioration in picture quality of other programs is often imperceptible even though the bit rate is lowered. Therefore, it is possible to lower the bit rate of the other programs and allocate a higher bit rate to the program having perceptible deterioration in picture quality. In the example of FIG. 2, at a time point t1, the image of drama (1) has perceptible deterioration in picture quality but the images of news and drama (2) have imperceptible deterioration in picture quality. Therefore, the bit rate of the images of new and drama (2) is lowered and a higher bit rate is accordingly allocated to the image of drama (1). By thus using the statistical multiplexing technique, a greater number of programs can be transmitted.

However, there arises a problem of phase of GOP (group of pictures). Normally, an encoder encodes images while carrying out rate control on the GOP basis, as represented by TM5 (Test Model Editing Comnmittee: "Test Model 5"; ISO/IEC JTC/SC292/WG11/N400 (April1993)). That is, the bit rate is not changed at a halfway point of the GOP. If the phases of GOP of the respective programs are matched (which rarely occurs in general), there is no problem. However, if the phases of GOP have discrepancy (which generally occurs in most cases), since the bit rate of the program is changed only at the leading end of the GOP, the bit rates of all the programs cannot be changed at a time. Therefore, a dead space (a portion where the bit rate is not allocated to any program) is generated, as shown in FIG. 3, and all the transmission capacity cannot be effectively used.

Thus, it may also be considered to employ a technique for encoding images while determining the target bit quantity for each frame unit instead of carrying out rate control on the GOP basis. However, in the case of digital broadcasting, it is necessary to strictly control the quantity of generated bits so as not to generate overflow or underflow of a VBV (video buffering verifier) buffer of a receiver (decoder). If the target bit quantity is determined for each frame unit, it is difficult to control the quantity of generated bits so as not to generate overflow or under of the VBV buffer.

DISCLOSURE OF THE INVENTION

In view of the foregoing status of the art, it is an object of the present invention to enable bit rate change even at a halfway point of a GOP while applying the bit rate changing algorithm of TM5, and thus enable effective utilization of the capacity of the transmission line.

A coding device according to the present invention includes: control means for calculating a target bit quantity allocated to each picture included in a GOP on the basis of a designated bit rate; and coding means for coding a coding target picture on the basis of the target bit quantity controlled by the control means. The control means corrects the target bit quantity allocated to the coding target picture on the basis of the difference between a first bit rate and a second bit rate when the designated bit rate is changed from the first bit rate to the second bit rate in the case where coding processing of the coding target picture is carried out by the coding means.

In this coding device, when the designated bit rate is changed from the first bit rate to the second bit rate in the case where coding processing of the coding target picture is carried out by the coding means, the control means corrects the target bit quantity allocated to the coding target picture on the basis of the difference between the first bit rate and the second bit rate.

A coding device according to the present invention includes: control means for calculating a target bit quantity allocated to a coding target picture on the basis of a bit quantity allocated to non-coded pictures in a GOP and a designated bit rate; and coding means for coding the coding target picture in accordance with the target bit quantity calculated by the control means. The control means corrects the target bit quantity provided to the coding means from a target bit quantity corresponding to a first bit rate to a target bit quantity corresponding to a second bit rate in the case where the designated bit rate is changed from the first bit rate to the second bit rate at a halfway point in the GOP.

In this coding device, in the case where the designated bit rate is changed from the first bit rate to the second bit rate at halfway point in the GOP, the control means corrects the target bit quantity provided to the coding means from the target bit quantity corresponding to the first bit rate to the target bit quantity corresponding to the second bit rate.

A coding device according to the present invention includes: control means for calculating a target bit quantity allocated to a coding target picture from a bit quantity allocated to non-coded pictures in a GOP; and coding means for coding the coding target picture in accordance with the target bit quantity calculated by the control means. The control means corrects the bit quantity of non-coded pictures so that the locus of change of the bit quantity of non-coded pictures becomes the locus at the time when each picture is coded at a second bit rate from a leading picture of the GOP, in the case where a designated bit rate is changed from a first bit rate to the second bit rate at a halfway point in the GOP. The control means calculates the target bit quantity allocated to the coding target picture on the basis of the corrected bit quantity of non-coded pictures.

In this coding device, in the case where the designated bit rate is changed from the first bit rate to the second bit rate at a halfway point in the GOP, the bit quantity of non-coded pictures is corrected so that the locus of change of the bit quantity of non-coded pictures becomes the locus at the time when each picture is coded at the second bit rate from the leading picture of the GOP, and the target bit quantity allocated to the coding target picture is calculated on the basis of the corrected bit quantity of non-coded pictures.

A coding device according to the present invention includes: control means for calculating a target bit quantity allocated to a coding target picture from a bit quantity allocated to non-coded pictures in a GOP; and coding means for coding the coding target picture in accordance with the target bit quantity calculated by the control means. The control means corrects the bit quantity of non-coded pictures from a bit quantity of non-coded pictures based on a first bit rate to a bit quantity of non-coded pictures based on a second bit rate in the case where a designated bit rate is changed from the first bit rate to the second bit rate at a halfway point in the GOP. The control means calculates the target bit quantity allocated to the coding target picture on the basis of the corrected bit quantity of non-coded pictures.

In this coding device, in the case where the designated bit rate is changed from the first bit rate to the second bit rate at a halfway point in the GOP, the bit quantity of non-coded pictures is corrected from the bit quantity of non-coded pictures based on the first bit rate to the bit quantity of non-coded pictures based on the second bit rate, and the target bit quantity allocated to the coding target picture is calculated on the basis of the corrected bit quantity of non-coded pictures.

A coding device according to the present invention includes: control means for calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and coding means for coding the coding target picture in accordance with the target bit quantity calculated by the control means. The control means corrects the target bit quantity provided to the coding means from a target bit quantity corresponding to a first bit rate to a target bit quantity corresponding to a second bit rate in the case where a designated bit rate is changed from the first bit rate to the second bit rate at a halfway point in a GOP.

In this coding device, in the case where the designated bit rate is changed from the first bit rate to the second bit rate at a halfway point in the GOP, the target bit quantity is corrected from the target bit quantity corresponding to the first bit rate to the target bit quantity corresponding to the second bit rate.

A coding device according to the present invention includes: control means for calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and coding means for coding the coding target picture in accordance with the target bit quantity calculated by the control means. The control means corrects the anticipated bit quantity allocated to non-coded pictures so that the locus of change of the anticipated bit quantity allocated to non-coded pictures becomes the locus at the time when each picture is coded at a second bit rate, in the case where a designated bit rate is changed from a first bit rate to the second bit rate at a halfway point in a GOP. The control means calculates the target bit quantity allocated to the coding target picture on the basis of the corrected bit quantity.

In this coding device, in the case where the designated bit rate is changed from the first bit rate to the second bit rate at a halfway point in the GOP, the anticipated bit quantity allocated to non-coded pictures is corrected so that the locus of change of the anticipated bit quantity allocated to non-coded pictures becomes the locus at the time when each picture is coded at the second bit rate, and the target bit quantity allocated to the coding target picture is calculated on the basis of the corrected bit quantity.

A coding device according to the present invention includes: control means for calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and coding means for coding the coding target picture in accordance with the target bit quantity calculated by the control means. The control means corrects the bit quantity allocated non-coded pictures from a bit quantity of non-coded pictures based on a first bit rate to a bit quantity of non-coded pictures based on a second bit rate in the case where a designated bit rate is changed from the first bit rate to the second bit rate at a halfway point in a GOP. The control means calculates the target bit quantity allocated to the coding target picture on the basis of the corrected bit quantity of non-coded pictures.

In this coding device, in the case where the designated bit rate is changed from the first bit rate to the second bit rate at a halfway point in the GOP, the bit quantity allocated non-coded pictures is corrected from the bit quantity of non-coded pictures based on the first bit rate to the bit quantity of non-coded pictures based on the second bit rate, and the target bit quantity allocated to the coding target picture is calculated on the basis of the corrected bit quantity of non-coded pictures.

A coding method according to the present invention includes: a control step of calculating a target bit quantity allocated to each picture included in a GOP on the basis of a designated bit rate; and a coding step of coding a coding target picture on the basis of the target bit quantity controlled by the control step. At the control step, when the designated bit rate is changed from a first bit rate to a second bit rate in the case where coding processing of the coding target picture is carried out by the coding step, the target bit quantity allocated to the coding target picture is corrected on the basis of the difference between the first bit rate and the second bit rate.

In this coding method, when the designated bit rate is changed from the first bit rate to the second bit rate in the case where coding processing of the coding target picture is carried out by the coding step, the target bit quantity allocated to the coding target picture is corrected on the basis of the difference between the first bit rate and the second bit rate.

A coding method according to the present invention includes: a control step of calculating a target bit quantity allocated to a coding target picture on the basis of a bit quantity allocated to non-coded pictures in a GOP and a designated bit rate; and a coding step of coding the coding target picture in accordance with the target bit quantity calculated by the control step. At the control step, in the case where the designated bit rate is changed from a first bit rate to a second bit rate at a halfway point in the GOP, the target bit quantity provided to the coding step is corrected from a target bit quantity corresponding to the first bit rate to a target bit quantity corresponding to the second bit rate.

In this coding method, in the case where the designated bit rate is changed from the first bit rate to the second bit rate at a halfway point in the GOP, the target bit quantity is corrected from the target bit quantity corresponding to the first bit rate to the target bit quantity corresponding to the second bit rate.

A coding method according to the present invention includes: a control step of calculating a target bit quantity allocated to a coding target picture from a bit quantity allocated to non-coded pictures in a GOP; and a coding step of coding the coding target picture in accordance with the target bit quantity calculated by the control step. At the control step, in the case where a designated bit rate is changed from a first bit rate to a second bit rate at a halfway point in the GOP, the bit quantity of non-coded pictures is corrected so that the locus of change of the bit quantity of non-coded pictures becomes the locus at the time when each picture is coded at the second bit rate from a leading picture of the GOP, and the target bit quantity allocated to the coding target picture is calculated on the basis of the corrected bit quantity of non-coded pictures.

In this coding method, in the case where the designated bit rate is changed from the first bit rate to the second bit rate at a halfway point in the GOP, the bit quantity of non-coded pictures is corrected so that the locus of change of the bit quantity of non-coded pictures becomes the locus at the time when each picture is coded at the second bit rate from the leading picture of the GOP, and the target bit quantity allocated to the coding target picture is calculated on the basis of the corrected bit quantity of non-coded pictures.

A coding method according to the present invention includes: a control step of calculating a target bit quantity allocated to a coding target picture from a bit quantity allocated to non-coded pictures in a GOP; and a coding step of coding the coding target picture in accordance with the target bit quantity calculated by the control step. At the control step, in the case where a designated bit rate is changed from a first bit rate to a second bit rate at a halfway point in the GOP, the bit quantity of non-coded pictures is corrected from a bit quantity of non-coded pictures based on the first bit rate to a bit quantity of non-coded pictures based on the second bit rate, and the target bit quantity allocated to the coding target picture is calculated on the basis of the corrected bit quantity of non-coded pictures.

In this coding method, in the case where the designated bit rate is changed from the first bit rate to the second bit rate at a halfway point in the GOP, the bit quantity of non-coded pictures is corrected from the bit quantity of non-coded pictures based on the first bit rate to the bit quantity of non-coded pictures based on the second bit rate, and the target bit quantity allocated to the coding target picture is calculated on the basis of the corrected bit quantity of non-coded pictures.

A coding method according to the present invention includes: a control step of calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and a coding step of coding the coding target picture in accordance with the target bit quantity calculated by the control step. At the control step, in the case where a designated bit rate is changed from a first bit rate to a second bit rate at a halfway point in a GOP, the target bit quantity provided to the coding step is corrected from a target bit quantity corresponding to the first bit rate to a target bit quantity corresponding to the second bit rate.

In this coding method, in the case where the designated bit rate is changed from the first bit rate to the second bit rate at a halfway point in the GOP, the target bit quantity is corrected from the target bit quantity corresponding to the first bit rate to the target bit quantity corresponding to the second bit rate.

A coding method according to the present invention includes: a control step of calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and a coding step of coding the coding target picture in accordance with the target bit quantity calculated by the control step. At the control step, in the case where a designated bit rate is changed from a first bit rate to a second bit rate at a halfway point in a GOP, the anticipated bit quantity allocated to non-coded pictures is corrected so that the locus of change of the anticipated bit quantity allocated to non-coded pictures becomes the locus at the time when each picture is coded at the second bit rate, and the target bit quantity allocated to the coding target picture is calculated on the basis of the corrected bit quantity.

In this coding method, in the case where the designated bit rate is changed from the first bit rate to the second bit rate at a halfway point in the GOP, the anticipated bit quantity allocated to non-coded pictures is corrected so that the locus of change of the anticipated bit quantity allocated to non-coded pictures becomes the locus at the time when each picture is coded at the second bit rate, and the target bit quantity allocated to the coding target picture is calculated on the basis of the corrected bit quantity.

A coding method according to the present invention includes: a control step of calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and a coding step of coding the coding target picture in accordance with the target bit quantity calculated by the control step. At the control step, in the case where a designated bit rate is changed from a first bit rate to a second bit rate at a halfway point in a GOP, the bit quantity allocated non-coded pictures from a bit quantity of non-coded pictures based on the first bit rate to a bit quantity of non-coded pictures based on the second bit rate, and the target bit quantity allocated to the coding target picture is calculated on the basis of the corrected bit quantity of non-coded pictures.

In this coding method, in the case where the designated bit rate is changed from the first bit rate to the second bit rate at a halfway point in the GOP, the bit quantity allocated non-coded pictures is corrected from the bit quantity of non-coded pictures based on the first bit rate to the bit quantity of non-coded pictures based on the second bit rate, and the target bit quantity allocated to the coding target picture is calculated on the basis of the corrected bit quantity of non-coded pictures.

BEST MODE FOR CARRYING OUT THE INVENTION

Figure 1:
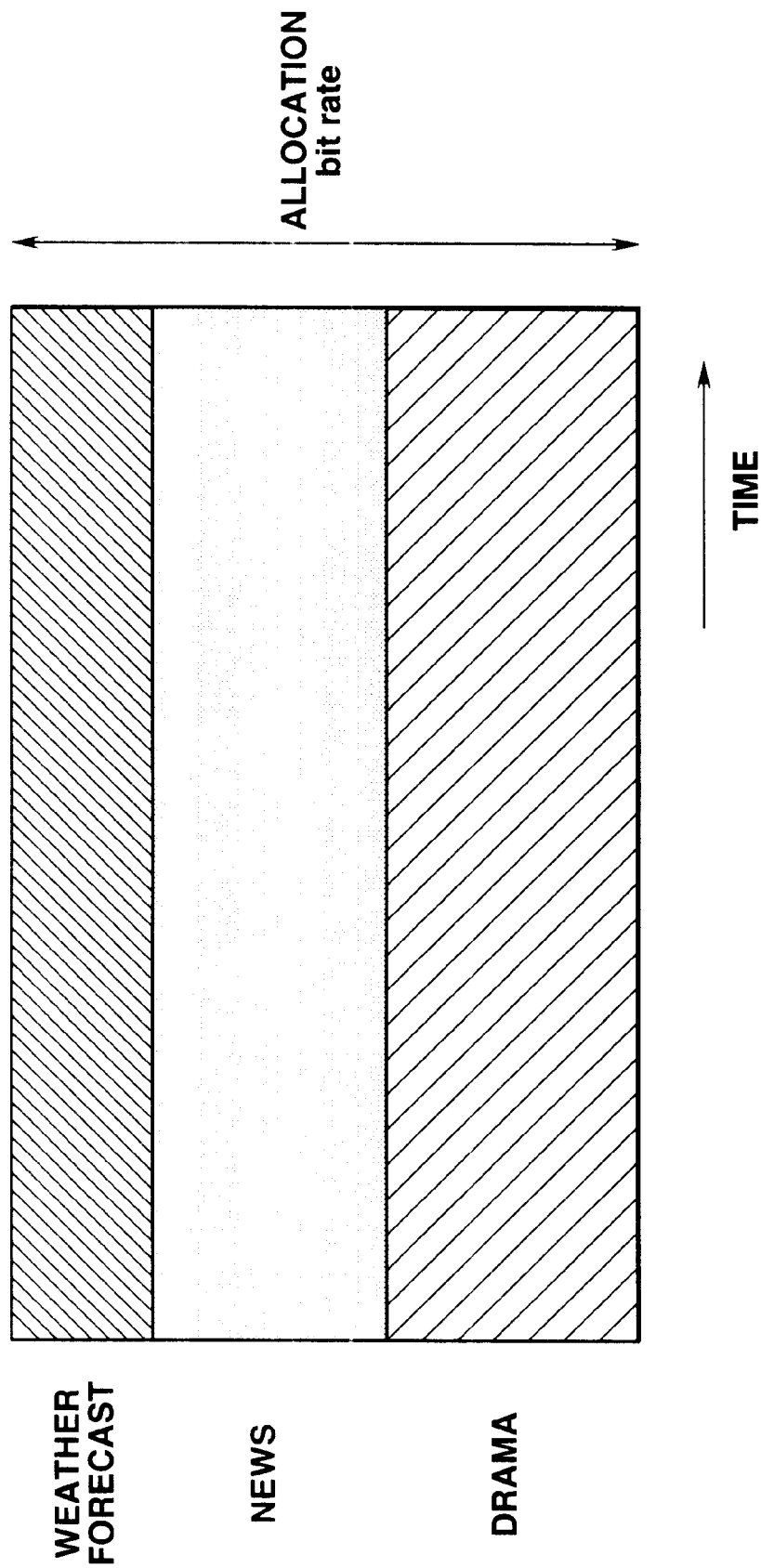
FIG. 1 illustrates multiplexing using a fixed rate.
Figure 2:
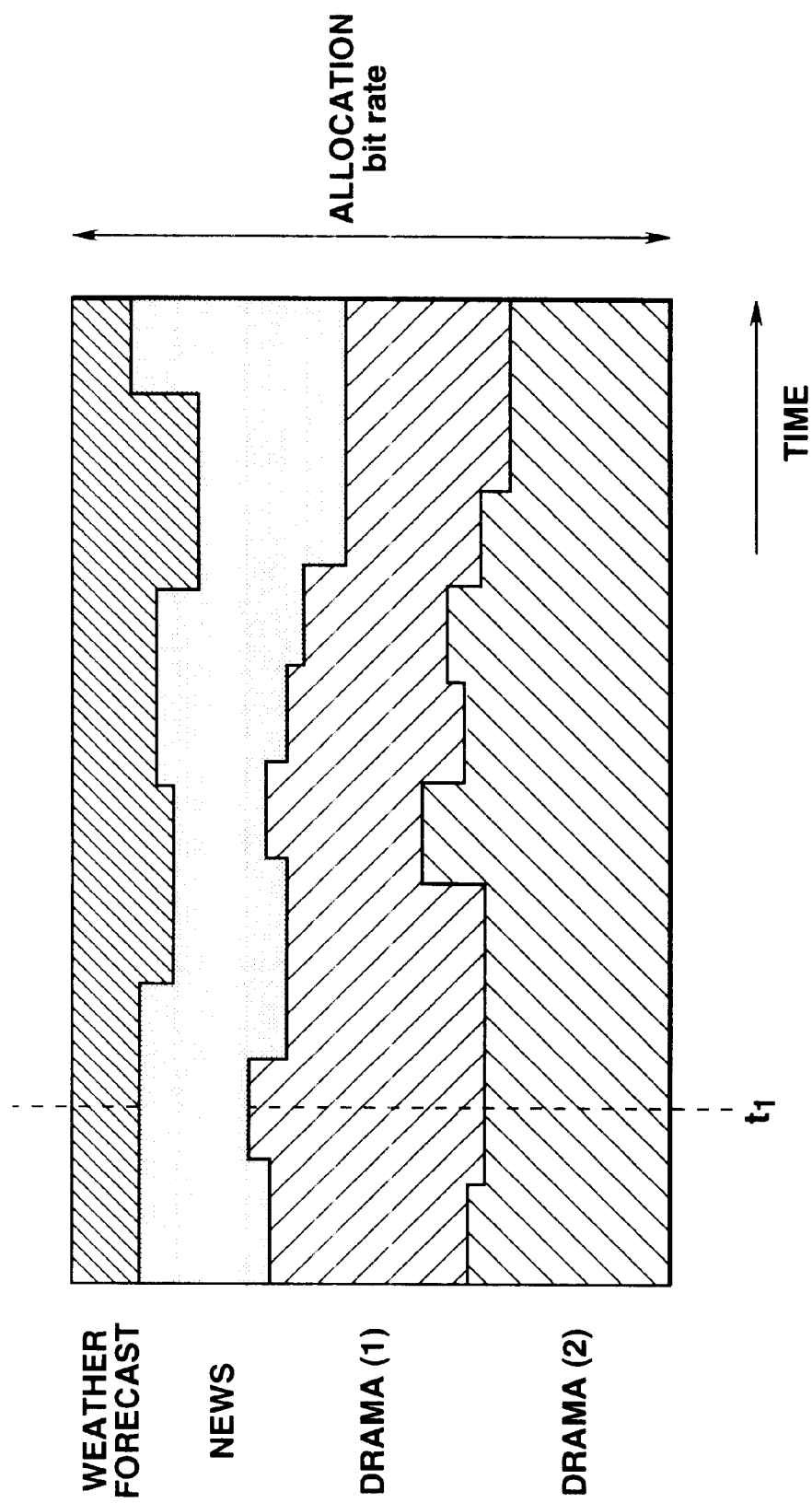
FIG. 2 illustrates multiplexing using statistical multiplexing.
Figure 3:
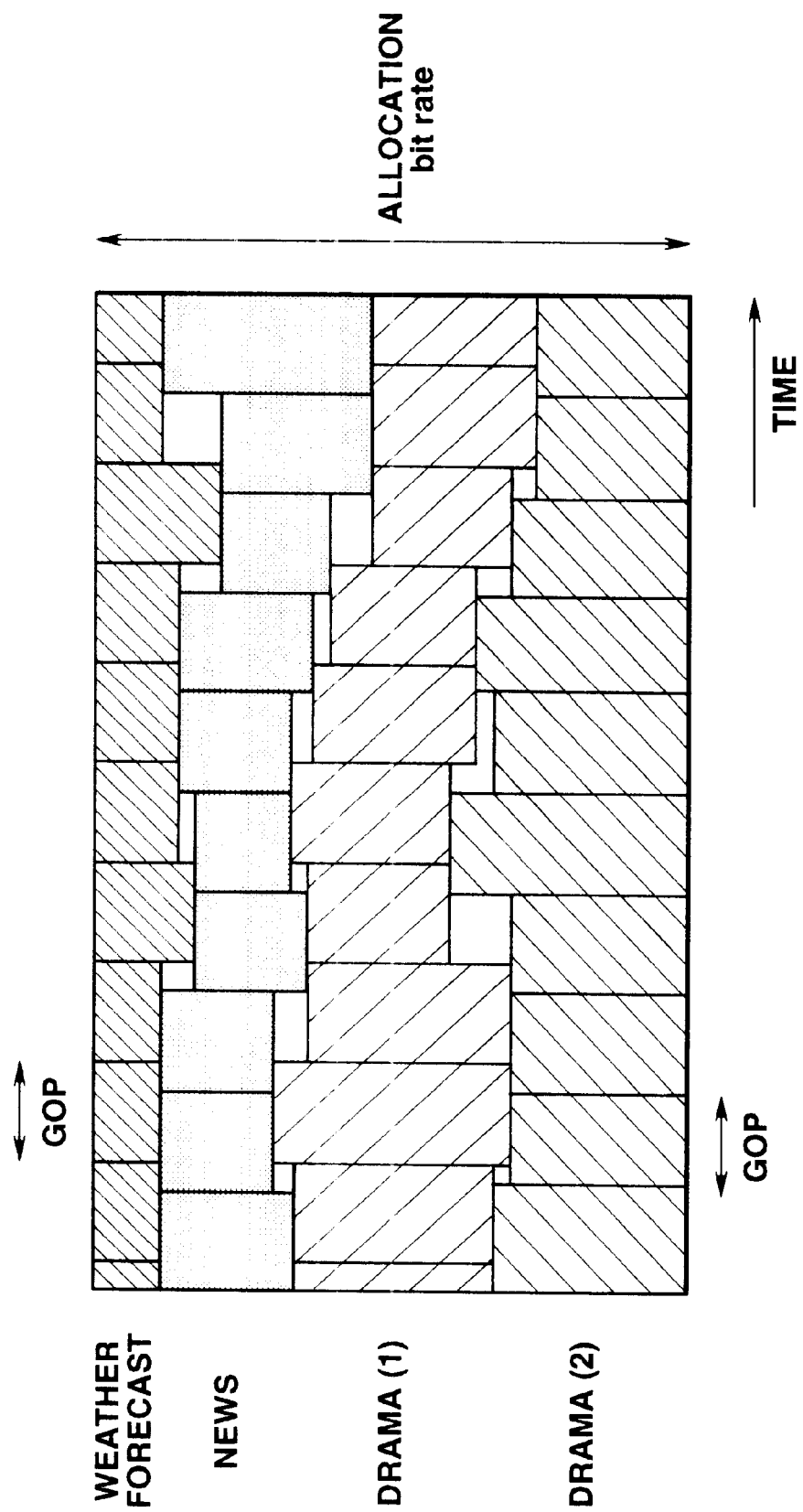
FIG. 3 illustrates changes of a bit allocation rate in the case where phases of GOP are not matched in statistical multiplexing.
Figure 4:
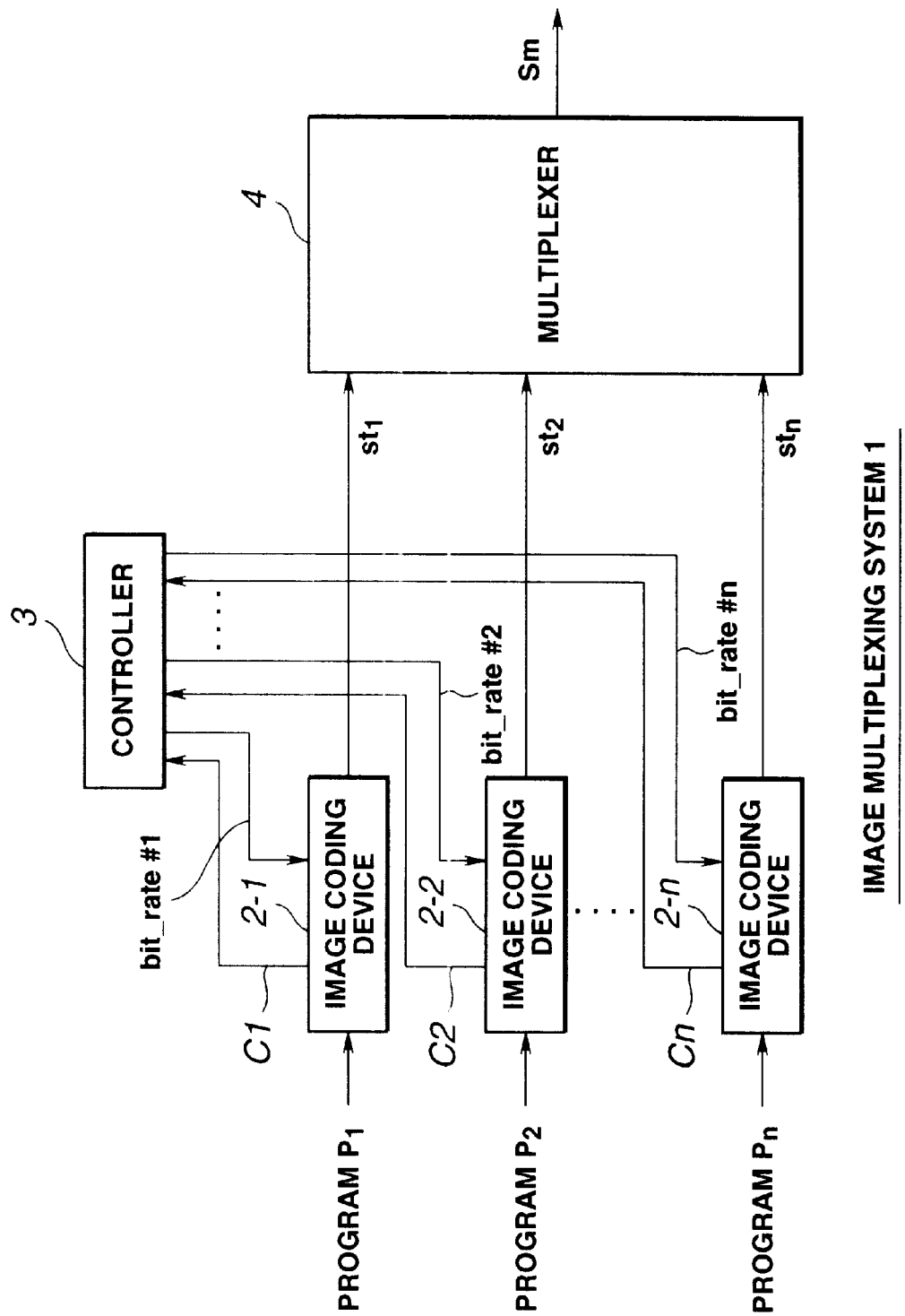
FIG. 4 is a block diagram showing an exemplary structure of an image multiplexing system to which the present invention is applied.

Preferred embodiments of the present invention will now be described in detail with reference to the drawings. FIG. 4 shows an exemplary structure of an image multiplexing system 1 to which the present invention is applied. The image multiplexing system 1 has a plurality of image coding devices 2-i for inputting and compression-coding programs Pi (i=1, 2, . . . , n) as program data of the present invention, a controller 3 for carrying out feedback-like control of the bit rate with respect to the individual image coding devices 2-i, and a multiplexer 4 for multiplexing compression-coded data sti outputted from the image coding devices 2-i and outputting image data Sm to a transmission line. The image coding devices 2-i find the complexity (global complexity) Ci of the programs Pi and output the complexity Ci to the controller 3. On the basis of the global complexity Ci from the image coding devices 2-i, the controller 3 determines the bit rate bit_rate#i of the image coding devices 2-i by statistical multiplexing and outputs the determined bit rate to the image coding devices 2-i.

In the case where the image multiplexing system 1 is used as a transmission system, the image data Sm outputted from the multiplexer 4 is outputted as transmission data to a transmission line. On the other hand, in the case where image multiplexing system 1 is used as a broadcasting system, the image data Sm outputted from the multiplexer 4 is transmitted as broadcast data to a receiving device through a transmission line for broadcasting.

Figure 5:
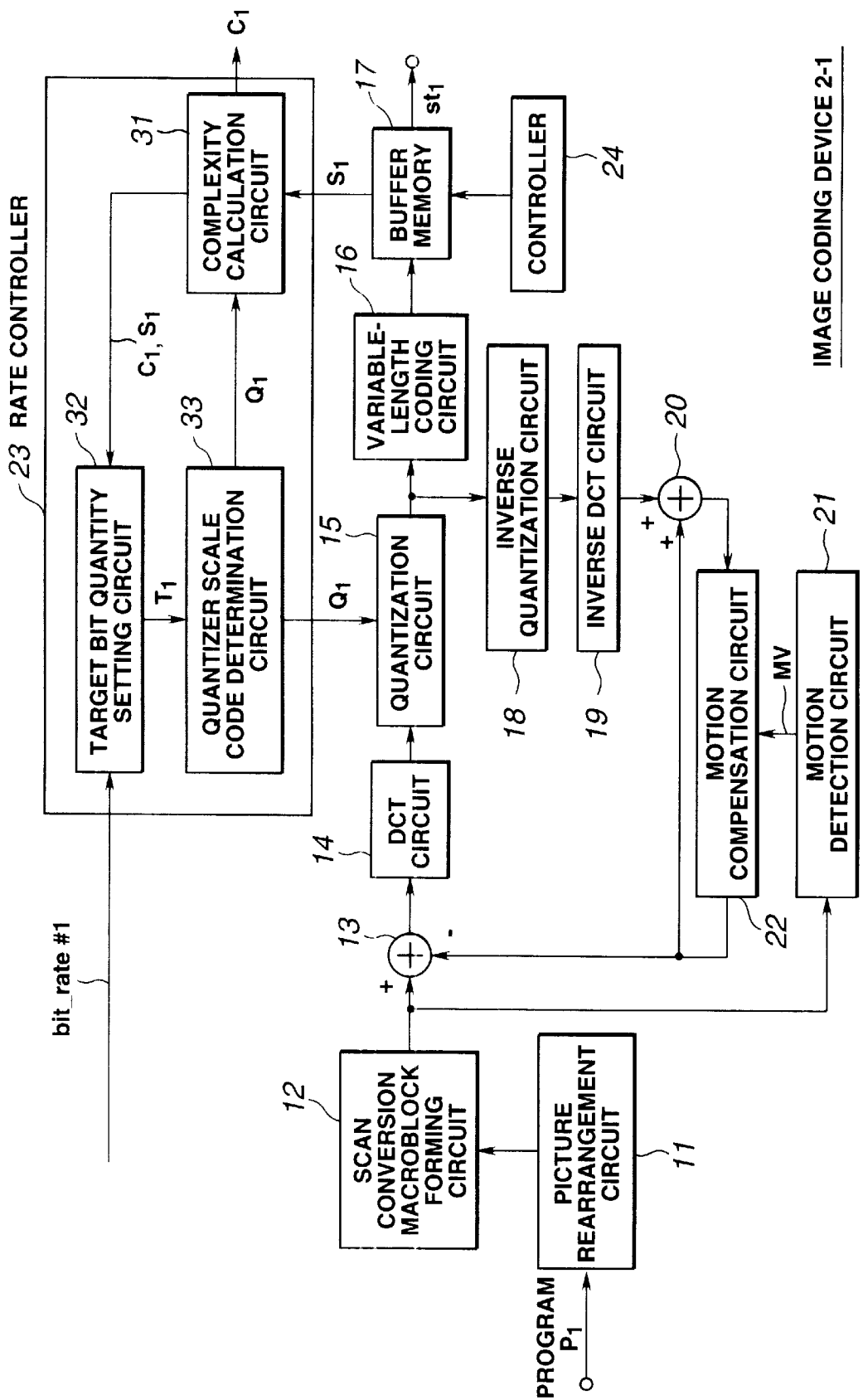
FIG. 5 is a block diagram showing an exemplary structure of an image coding device 2-1 of FIG. 4.

FIG. 5 is a block diagram showing the detailed structure of the image coding device 2-1 of FIG. 4. (Although not shown, the image coding devices 2-2 to 2-n are similarly constituted.) As shown in FIG. 5, the image coding device 2-1 has a picture rearrangement circuit 11 for inputting a program P1 and rearranging the order of pictures (I-picture, P-picture, B-picture) in accordance with the coding order, and a scan conversion macroblock forming circuit 12 for inputting output data of the picture rearrangement circuit 11, then discriminating whether the output data has a frame structure or a field structure, then carrying out scan conversion in accordance with the discrimination result, and carrying out macroblock forming of 16×16 pixels. A motion detection circuit 21 searches for a noted macroblock in a picture as a compression coding target on the basis of output data of the scan conversion macroblock forming circuit 12, and also searches for a macroblock (predictive macroblock) in a reference picture having the minimum absolute value sum or square sum of difference in pixel value from the noted macroblock. Then, the motion detection circuit 21 detects a motion vector MV from these macroblocks and sends the motion vector MV to a motion compensation circuit 22.

A subtracter 13 subtracts predictive image data (predictive macroblock) generated by the motion compensation circuit 22 on the basis of the motion vector MV from the motion detection circuit 21, from the output of the scan conversion macroblock forming circuit 12, and outputs the subtraction result to a DCT (discrete cosine transform) circuit 14. The DCT circuit 14 carries out DCT of inputted data and outputs the DCT result to a quantization circuit 15. The quantization circuit 15 quantizes the data inputted from the DCT circuit 14 on the basis of a quantizer scale code Q1 outputted from a quantizer scale code determination circuit 33 of a rate controller 23, and outputs the quantized data to a variable-length coding circuit 16 and an inverse quantization circuit 18.

The variable-length coding circuit 16 carries out variable-length coding of the data inputted from the quantization circuit 15 and outputs the coded data to the multiplexer 4 through a buffer memory 17. The usable capacity of the buffer memory 17 is controlled by a controller 24.

The inverse quantization circuit 18 caries out inverse quantization of the data supplied from the quantization circuit 15 and outputs the inversely quantized data to an inverse DCT circuit 19. The inverse DCT circuit 19 carries out inverse DCT of the data supplied from the inverse quantization circuit 18 and outputs the inverse DCT result to an adder 20. The adder 20 adds the predictive image data outputted from the motion compensation circuit 22 and the data outputted from the inverse DCT circuit 19. The adder 20 then outputs to the motion compensation circuit 22 the original image data (locally decoded image data) obtained by addition, and causes the motion compensation circuit 22 to store the image data into its built-in frame memory.

The rate controller 23 generates the quantizer scale code Q1 based on the signal bit_rate#1 from the controller 3 of FIG. 4 and the quantity of generated bits S1 from the buffer memory 17, and outputs the quantizer scale code Q1 to the quantization circuit 15. Therefore, a complexity calculation circuit 31 of the rate controller 23 calculates the global complexity C1 in accordance with the following equations (where Xi, Xp and Xb represent the global complexity). The global complexity C1 is data indicating the complexity of the pattern of compressed image data, and its value is obtained by multiplying the quantity of generated bits (data quantity) S1 of the compressed image data (supplied from the buffer memory 17) and the quantizer scale code Q1 (supplied from the quantizer scale code determination circuit 33).

$$Xi = Si \times Qi \quad (1)$$

$$Xp = Sp \times Qp \quad (2)$$

$$Xb = Sb \times Qb \quad (3)$$

In the above-mentioned equations, Xi, Xp and Xb express the global complexity C1 of I-picture, P-picture and B-picture, respectively. Si, Sp and Sb express the quantity of generated bits S1 in the case where I-picture, P-picture and B-picture are coded by the variable-length coding circuit 16. Qi, Qp and Qb express the quantizer scale code Q1 in generating I-picture, P-picture and B-picture, respectively.

This global complexity C1 is necessarily coincident with the coding difficulty D1 used in a feed-forward bit rate control system, which will be later described with reference to FIGS. 17 and 18. However, it is substantially coincident with the coding difficulty D1 unless the quantizer scale code Q1 is extremely large or small.

The complexity calculation circuit 31 outputs the complexity C1 (Xi, Xp, Xb) found by arithmetic operation in accordance with the equations (1) to (3), to the controller 3 of FIG. 4. The complexity calculation circuit 31 also outputs the complexity C1 together with the quantity of generated bits S1 (Si, Sp, Sb) to a target bit quantity setting circuit 32. The target bit quantity setting circuit 32 sets a target bit quantity T1 based on the signal bit_rate#1 supplied from the controller 3 and the complexity C1 and the quantity of generated bits S1 (Si, Sp, Sb) supplied from the complexity calculation circuit 31, and outputs the set target bit quantity T1 to the quantizer scale code determination circuit 33. The quantizer scale code determination circuit 33 determines the quantizer scale code Q1 in accordance with the inputted target bit quantity T1, and outputs the quantizer scale code Q1 to the quantization circuit 15 and the complexity calculation circuit 31.

The operation of the image multiplexing system 1 shown in FIG. 4 will now be described. In this image multiplexing system 1, each program Pi is coded by each image coding device 2-i. The image coding device 2-i calculates the global complexity Ci expressing the complexity of the image which is already coded with respect to the program Pi, and outputs the calculated global complexity Ci to the controller 3. On the basis of the inputted global complexity Ci, the controller 3 determines the target bit rate bit_rate#i as a target bit rate, which is a target quantity of generated bits per unit time with respect to each program Pi, by using a statistical multiplexing technique, and outputs the determined target bit rate to the image coding device 2-i. On the basis of the inputted target bit rate bit_rate#i, the image coding device 2-i compression-codes the program Pi and outputs compression-coded data sti to the multiplexer 4. The multiplexer 4 multiplexes the inputted compression-coded data sti to generate image data Sm for output, and outputs the image data Sm to the transmission line.

The basic operation of the image coding device 2-1 shown in FIG. 5 will now be described. First, the picture rearrangement circuit 11 of the image coding device 2-1 rearranges the order of pictures (I-picture, P-picture and B-picture) of the program P1 in accordance with the coding order. Then, the scan conversion macroblock forming circuit 12 discriminates whether the pictures have a fame structure or a field structure, and carries out scan conversion and macroblock forming in accordance with the discrimination result. The output data of the scan conversion macroblock forming circuit 12 is sent to the motion detection circuit 21 and the subtracter 13.

If the inputted picture is I-picture, no difference from predictive image data is taken by the subtracter 13. The output data of the scan conversion macroblock forming circuit 12 is inputted directly to the DCT circuit 14 and is converted to a DCT coefficient. The DCT coefficient is quantized by the quantization circuit 15 on the basis of the quantizer scale code Q1 determined by the quantizer scale code determination circuit 33, and is then coded by variable-length coding by the variable-length coding circuit 16. The output data of the variable-length coding circuit 16 is temporarily held by the buffer memory 17, and is then outputted to the multiplexer 4 as compression-coded data st1 made up of bit streams.

The inverse quantization circuit 18 inversely quantizes the output data of the quantization circuit 15. The inverse DCT circuit 19 carries out inverse DCT of the output data of the inverse quantization circuit 18 and inputs the inverse DCT data to the motion compensation circuit 22 through the adder 20 so as to hold the data in the motion compensation circuit 22.

If the inputted picture is P-picture, the motion compensation circuit 22 generates predictive image data based on image data corresponding to the past I-picture or P-picture held therein and the motion vector MV from the motion detection circuit 21, and the predictive image data is outputted to the subtracter 13 and the adder 20. The subtracter 13 calculates the difference between the output data from the scan conversion macroblock forming circuit 12 and the predictive image data from the motion compensation circuit 22. This differential data is converted to a DCT coefficient by the DCT circuit 14 and is then quantized by the quantization circuit 15. The variable-length coding circuit 16 carries out variable-length coding of the output data from the quantization circuit 15 and outputs the resultant data as compression-coded data st1 to the multiplexer 4 through the buffer memory 17.

The inverse quantization circuit 18 inversely quantizes the output data of the quantization circuit 15. The inverse DCT circuit 19 carries out inverse DCT of the output data of the inverse quantization circuit 18. The adder 20 adds the output data of the inverse DCT circuit 19 and the predictive image data outputted from the motion compensation circuit 22, and inputs the added data to the motion compensation circuit 22 so as to hold the data therein.

If the inputted picture is B-picture, the motion compensation circuit 22 generates predictive image data based on two image data corresponding to the past and future I-pictures or P-pictures held therein and two motion vectors MV from the motion detection circuit 21, and the predictive image data is outputted to the subtracter 13 and the adder 20. The subtracter 13 calculates the difference between the output data of the scan conversion macroblock forming circuit 12 and the predictive image data from the motion compensation circuit 22. This differential data is converted to a DCT coefficient by the DCT circuit 14 and is then quantized by the quantization circuit 15. The variable-length coding circuit 16 carries out variable-length coding of the output data of the quantization circuit 15 and outputs the resultant data as compression-coded data st1 to the multiplexer 4 through the buffer memory 17. B-picture is not held by the motion compensation circuit 22.

The rate control operation of the rate controller 23 and the controller 24 will now be described with reference to the flowcharts of FIGS. 6 and 7. In the following description, the subscript "i" as in the quantity of generated bits Si, global complexity Ci, target bit quantity Ti, quantizer scale code Qi, compression-coded data (coded stream) sti and bit rate bit_rate#i corresponding to each program Pi is basically omitted in order to avoid complication of symbols, except for the case where these must be discriminated individually.

In a GOP (group of pictures) defined in accordance with the MPEG standard, the j-th picture is expressed as a picture (j), and the (j+1)th picture is expressed as a picture (j+1). The number of pictures included in the GOP is denoted by N.

In the following description, pictures up to the picture (j) are coded at a first bit rate bit_rate(j), and pictures from the picture (j+1) are coded at a second bit rate bit_rate(j+1).

At step S1, the target bit quantity setting circuit 32 of the rate controller 23 calculates target bit quantities Ti(j), Tp(j), Tb(j) with respect to the picture (j) as the j-th picture in the GOP, in accordance with the following equations (4) to (6).

$$T_i(j) = \max\left\{\frac{R(j)}{1 + \frac{N_p X_p}{X_i K_p} + \frac{N_b X_b}{X_i K_b}}, bit\_rate(j)/(8 \times pic\_rate)\right\} \quad (4)$$

$$T_p(j) = \max\left\{\frac{R(j)}{N_p + \frac{N_b K_p X_b}{K_b X_p}}, bit\_rate(j)/(8 \times pic\_rate)\right\} \quad (5)$$

$$T_b(j) = \max\left\{\frac{R(j)}{N_b + \frac{N_p K_b X_p}{K_p X_b}}, bit\_rate(j)/(8 \times pic\_rate)\right\} \quad (6)$$

In the above equations, R(j) expresses the bit quantity allocated to an non-coded picture which has not been coded (that is, a picture to be coded from now on) in the GOP including the picture (j) as a coding target. In short, this R(j) is a value obtained by adding bit quantities that should be allocated to the picture (j), picture (j+1), . . . , picture (N). Np and Nb express the number P-pictures or B-pictures which have not been coded in the GOP. Xi, Xp and Xb express the global complexity C of I-picture, P-picture and B-picture, respectively. Kp and Kb express the ratio of the quantizer scale code of P-picture and B-picture with reference to the quantizer scale code of I-picture, and take values expressed by the following equations.

$$Kp=1.0 \quad (7)$$

$$Kb=1.4 \quad (8)$$

That is, the quantizer scale code of P-picture is once the quantizer scale code of I-picture, but the quantizer scale code of B-picture is constantly 1.4 times the quantizer scale code of I-picture and P-picture. Thus, since B-picture is coded relatively roughly in comparison with I-picture or P-picture, the bit quantity that can be saved in B-picture can be added to the bit quantity of I-picture and P-picture. Therefore, the S/N ratio of I-picture and P-picture is improved and the S/N ratio of B-picture which refers to the S/N ratio of I-picture and P-picture is also improved. The overall S/N ratio is thus improved.

The initial values of the complexity Xi, Xp, Xb are set at values expressed by the following equations based on the target bit rate bit_rate(j) (bits/sec).

$$Xi=160 \times bit\_rate(j)/115 \quad (9)$$

$$Xp=60 \times bit\_rate(j)/115 \quad (10)$$

$$Xb=42 \times bit\_rate(j)/115 \quad (11)$$

Bit_rate(j) expresses the bit rate which has been designated with respect to the pictures up to the picture (j) by the controller 3. Pic_rate expresses the picture rate. For example, in the case of the NTSC system, this picture rate is 30 (frames/sec). Max{A,B} expresses a function selecting the greater one of A and B.

The values of R(j), Np, Nb, Kp, Kb and pic_rate are supplied from the controller 24 (FIG. 5) provided in each image coding device 2-i. The values of Xi, Xp and Xb are calculated by the complexity calculation circuit 31 in accordance with the equations (1) to (3), as described above.

In the equations (4) to (6), the bit quantity of what number of allocation target pictures to which the estimate bit quantity generated for the entire non-coded pictures corresponds is found.

For example, in the equation (4), NpXpiKp of the second term of the denominator of the first factor expresses the bit quantity of what number of I-pictures to which Np non-coded P-pictures in the GOP correspond, and NbXb/XiKb of the third term expresses the bit quantity of what number of I-pictures to which Nb non-coded B-pictures in the GOP correspond. The first term, 1, expresses the number of I-pictures in the GOP. (The number of I-pictures in one GOP is constantly 1). Therefore, the first factor in the equation (4) expresses the bit quantity per picture on the assumption that all the remaining (N−j+1) pictures in the GOP are I-pictures. N expresses the number of pictures included in the GOP.

Similarly, in the equation (5), NbKpXb/KbXp of the second term of the denominator of the first factor expresses the bit quantity of what number of P-pictures to which Np non-coded B-pictures in the GOP correspond. Therefore, the first factor in the equation (5) expresses the bit quantity per picture on the assumption that all the remaining (N−j+1) pictures in the GOP are P-pictures.

Moreover, in the equation (6), NpKbXp/KpXb of the second term of the denominator of the first factor expresses the bit quantity of what number of B-pictures to which Np non-coded P-pictures in the GOP correspond. Therefore, the first factor expresses the bit quantity per picture on the assumption that all the remaining (N−j+1) pictures in the GOP are B-pictures.

Fundamentally, the values of the first factors in the equations (4) to (6) are determined as the target bit quantities Ti(j), Tp(j) and Tb(j) of I-picture, P-picture and B-picture. (Hereinafter, if I-picture, P-picture and B-picture need not be discriminated, the target quantity is described simply as T(j).) However, if the values found by arithmetic operation are too small, there is a risk that the VBV buffer of the image decoding device will overflow. Therefore, the value bit_rate(j)/(8×pic_rate) prescribed by the second factors in the equations (4) to (6) is selected as the target bit quantity T(j).

On the assumption that the data occupancy quantity of the VBV buffer immediately before encoding the picture (j) as the coding target is B*(j) and that the bit quantity of the same value as the target bit quantity T(j) is generated by actual coding of the picture (j), the occupancy quantity B*(j+1) of the VBV buffer immediately before encoding the next picture (j+1) is expressed by the following equation. At step S2, the controller 24 calculates this occupancy quantity B*(j+1) in accordance with the following equation.

$$B^*(j+1)=B^*(j)-T(j)+(t_{j+1}-t_j)\times bit\_rate(j+1) \quad (12)$$

In this equation (12), $t_j$ expresses the timing at which the picture (j) is read out from the VBV buffer, and $t_{j+1}$ expresses the timing at which the picture (j+1) is read out from the VBV buffer. Bit_rate(j+1) expresses the bit rate newly set with respect to the picture (j+1) and the subsequent pictures.

In addition, at step S2, the controller 24 determines a usable range of the VBV buffer in accordance with the following equation.

$$vbv\_size(j+1) \min\{\tau max \times bit\_rate(j+1), vbv\_size(0)\} \quad (13)$$

In this equation, vbv_(0) expresses the capacity of the VBV buffer in the case where the delay time of the VBV buffer reaches the maximum value τmax, and min{A,B} expresses a function selecting the smaller one of A and B.

That is, in this example, in the case where the maximum value of the delay time of the VBV buffer is prescribed in advance by the operator or the like and where such a bit rate that the delay time of the VBV buffer exceeds the prescribed maximum value is used, the controller 24 narrows the usable range of the VBV buffer (corresponding to the buffer memory 17 of FIG. 5), that is, equivalently reduces the capacity of the VBV buffer, and controls the delay time so as not to exceed the maximum value. The maximum value τmax is expressed by the following equation.

$$\tau max = vbv\_size(0)/bit\_rate(0) \quad (14)$$

In this equation, vbv_size(0) expresses the maximum capacity of the VBV buffer (a predetermined value in the MPEG standard), and bit_rate(0) expresses the bit rate in the case where the delay time of the VBV buffer reaches the maximum value τmax.

At step S3, the controller 24 compares the value of the occupancy quantity B*(j+1) of the VBV buffer calculated at step S2 and the value of the vbv_size(j+1). As a result of comparison, if B*(j+1) is equal to or greater than vbv_size (j+1), (that is, if the target bit quantity T(j) must be corrected because the delay time of the VBV buffer exceeds the value τmax if the vbv_size(j+1) of the VBV buffer is used as it is,) the processing goes to step S4 and the target bit quantity T(j) calculated at step S1 is corrected by the amount of difference between B*(j+1) and vbv_size(j+1) in accordance with the following equation.

$$T(j)=T(j)+B^*(j+1)-vbv\_size(j+1) \quad (15)$$

If it is determined at step S3 that B*(j+1) is smaller than vbv_size(j+1), it does not enter the unusable range of the VBV buffer. Therefore, the processing of step S4 is skipped.

Next, at step S5, the picture (j) is encoded on the basis of the target bit quantities Ti(j), Tp(j) and Tb(j) calculated at step S1 or the target bit quantities Ti(j), Tp(j) and Tb(j) corrected at step S4. Specifically, the quantizer scale code determination circuit 33 determines the quantizer scale code Q1 corresponding to the target bit quantity T1 (Ti(j), Tp(j) or Tb(j) set by the target bit quantity setting circuit 32. The quantization circuit 15 quantizes the picture A) in accordance with the quantizer scale code Q1. The processing in this case is as described above and therefore will not be described further in detail.

Up to this step, processing for the j-th picture (j) in the GOP is completed. At the following steps, processing for the (j+1)th picture (j+1) in the GOP is carried out.

At step S6, the controller 24 subtracts the bit quantity S(j) generated by coding the picture (j) rom the bit quantity R(j) of the non-coded picture before coding the picture (j), in accordance with the following equation, and thus finds the bit quantity R(j+1) allocated to non-coded pictures including the coding target picture (j+1). In short, R(j+1) expresses the bit quantity obtained by adding the bit quantities allocated to all the pictures from the picture (j+1) as the coding target to the last picture (N) in the GOP.

$$R(j+1)=R(j)-S(j) \quad (16)$$

At step S7, the controller 24 corrects the bit quantity R(j+1) calculated at step S6 by using the quantity of change {vbv_size(j)−vbv_size(j+1)} of the usable range of the VBV buffer, in accordance with the following equation.

$$R(j+1)=R(j+1)+\{vbv\_size(j)-vbv\_size(j+1)\} \quad (17)$$

The meaning of processing up to step S7 will now be described further in detail with reference to FIGS. 8 to 13.

Figure 8:
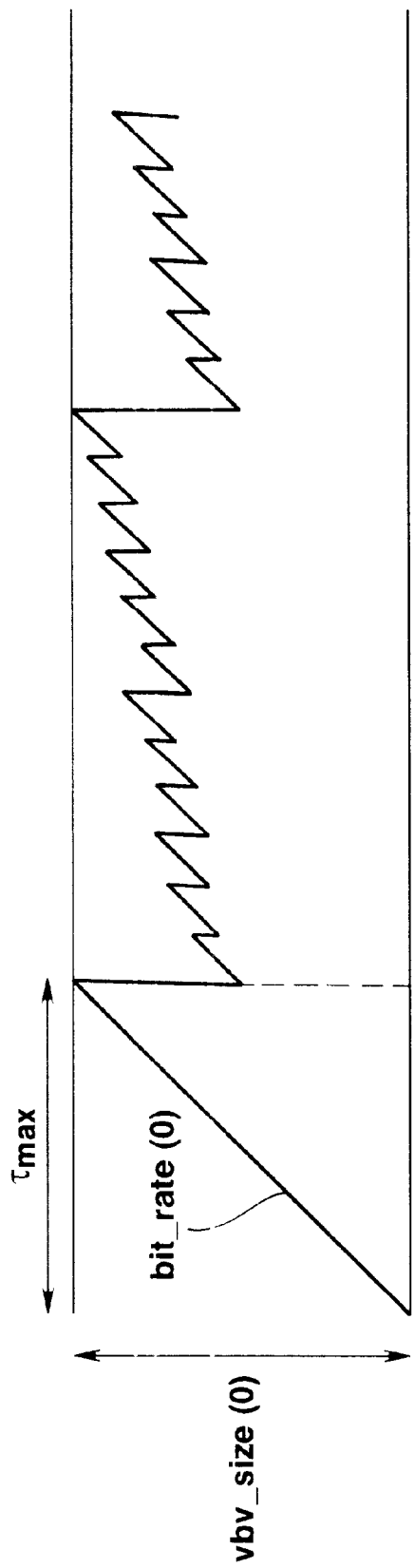
FIG. 8 illustrates changes of the capacity of a VBV buffer.
Figure 9:
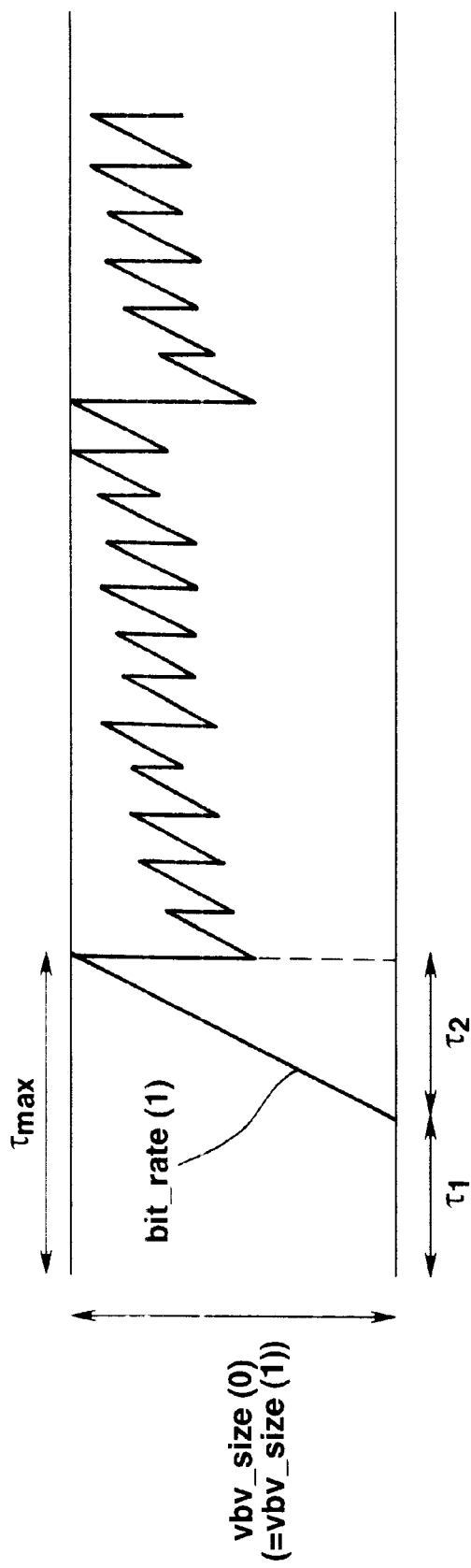
FIG. 9 illustrates changes of the capacity of the VBV buffer.

If the bit rate bit_rate(j) designated by the controller 3 is equal to the bit rate bit_rate(0) (hereinafter referred to also as a threshold value) of the case where the delay time of the VBV buffer reaches the maximum value τmax, the controller 24 controls the VBV buffer (buffer memory 17) as shown in FIG. 8. (The character "j" does not indicate the character "i" (for program Pi) in bit_rate#i of FIG. 4 but indicates the order of the picture. Both of these characters can be collectively described as in bit_rate#(j).) As shown in FIG. 8, the capacity of the VBV buffer sequentially increases at the bit rate bit_rate(0). At the point when the delay time τmax has elapsed, the capacity of the VBV buffer becomes vbv_size (j). Then, image data stored in the VBV buffer is reduced every time it is suitably read out and decoded. When image data is newly written, the data quantity is increased. The operation as described above is sequentially repeated.

If the bit rate bit_rate(1) designated by the controller 3 is greater than the threshold value bit_rate(0), the controller 24 controls the buffer memory 17 at the time of encoding processing of step S5 and delays the output of image data by the time τ1. This delay time τ1 is calculated in accordance with the following equation.

$$\tau 1 = \tau max - \tau 2$$
$$= \tau max - vbv\_size(0)/bit\_rate(1) \quad (18)$$

After this delay time τ1, data is written into the VBV buffer at the bit rate bit_rate(1). At the point when the time τ2 has elapsed after the start of writing, the capacity of the VBV buffer becomes vbv_size(1)=vbv_size(0). As is clear from comparison between FIG. 8 and FIG. 9, the maximum delay time τmax of the VBV buffer is the same in both cases.

If the bit rate bit_rate(2) designated by the controller 3 is smaller than the threshold value bit_rate(0), the controller 24 controls the buffer memory 17 and sets (limits) the capacity (usable range) of the buffer memory 17 to not more than vbv_size(2). This arithmetic operation is carried out at step S2 of FIG. 6. Specifically, the range exceeding the vbv_size(2), of the capacity vbv$_{hd}$ _size(0) of the VBV buffer, is not used in this example. As a result, at the point when the delay time τmax has been elapsed, the capacity vbv_size of the VBV buffer becomes vbv_size(2) (=τmax× bit_rate(2)). Therefore, in this case, too, the delay time of the VBV buffer is τmax. In other words, the delay time of the VBV buffer is constant at τmax in any of the cases of FIGS. 8 to 10.

Thus, seamless changes of the bit rate can be carried out in a broad range and can be applied to a live broadcast having a constant delay time in digital broadcasting.

Figure 10:
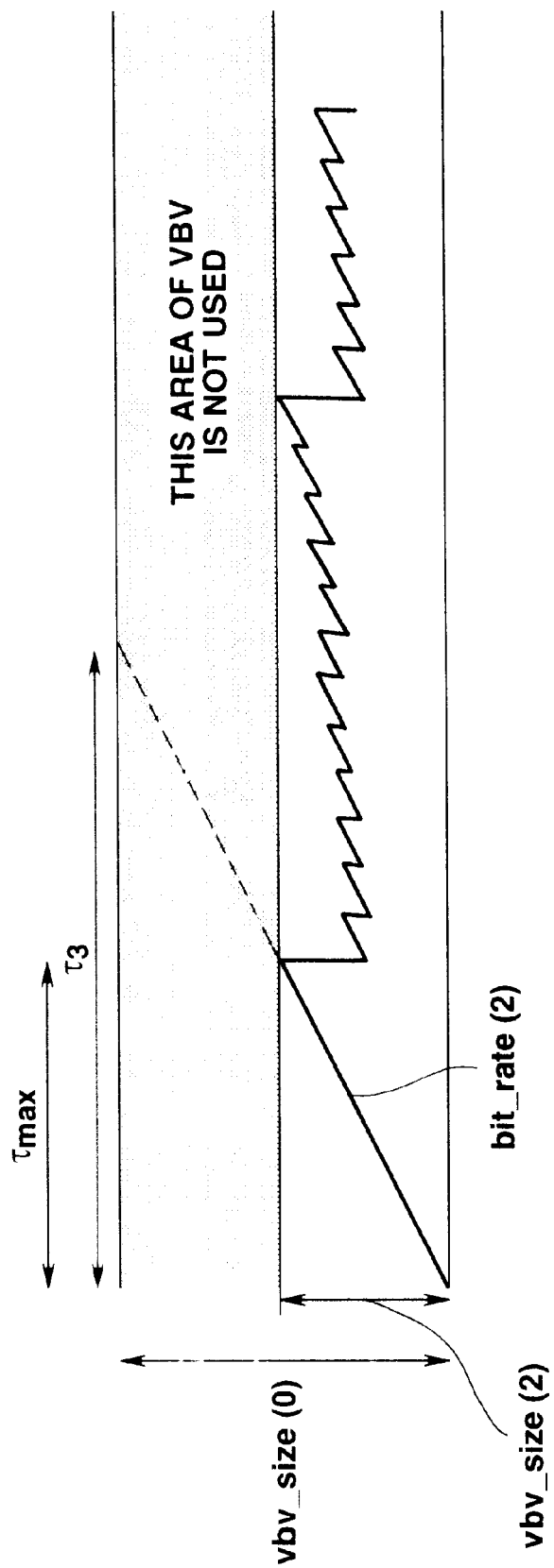
FIG. 10 illustrates changes of the capacity of the VBV buffer.

In FIG. 10, if data is written into the VBV buffer for a delay time τ3 (=vbv_size(0)/bit_rate(2)), the capacity of the VBV buffer will become vbv_size(0). In this example, however, since only the range not more than the capacity vbv_size(2) is used, the capacity does not actually reach vbv_size(0).

Figure 11:
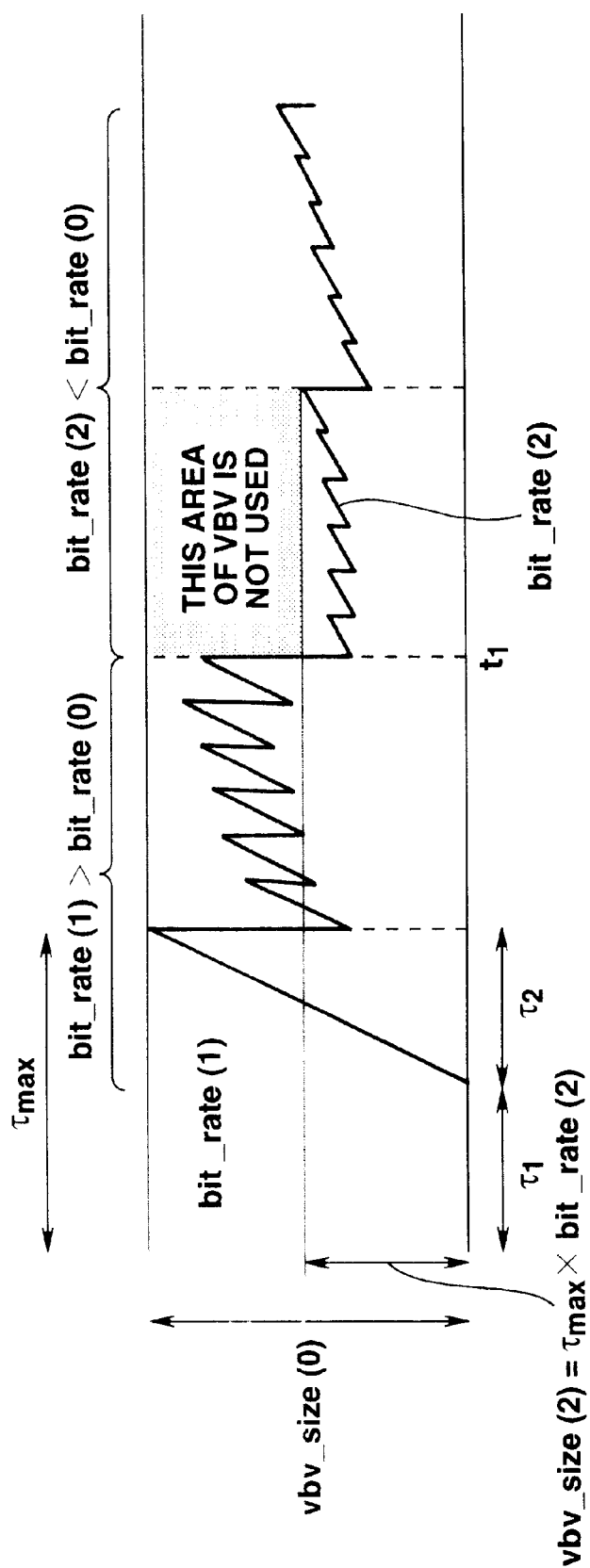
FIG. 11 illustrates changes of the capacity of a VBV buffer.

FIG. 11 shows the state of changes of the VBV buffer in the case where the bit rate is changed from bit_rate(1) to bit_rate(2) at a halfway point. During the time period up to the time point t1, the value of the bit rate is bit_rate(1), which is greater than the threshold value bit_rate(0). Therefore, the state of changes of the VBV buffer in this case is similar to that of FIG. 9. On the other hand, if the bit rate is changed at the time point t1 to the bit rate bit_rate(2), which is smaller than the threshold value bit_rate(0), the capacity of the VBV buffer is limited to vbv_size(2) (=τmax×bit_rate(2)).

Figure 12:
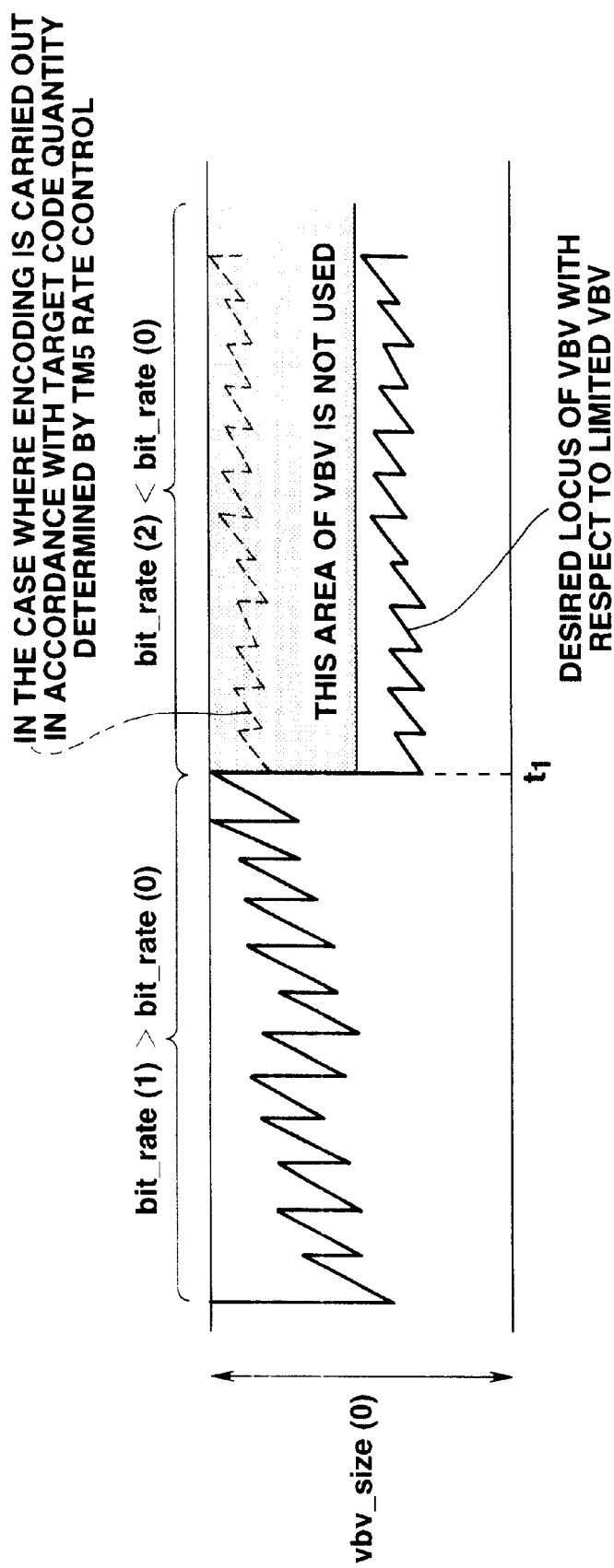
FIG. 12 illustrates changes of the capacity of the VBV buffer.

In the case where a rate control system on the assumption of a fixed bit rate such as TM5 and a fixed capacity of the VBV buffer is used, calculation of the usable range of the VBV buffer alone generates a problem as shown in FIG. 12. Specifically, in the case where the bit rate is changed from the value bit_rate(1) greater than the threshold value bit_rate(j) to the value bit_rate(2) smaller than the threshold value bit_rate(0), the locus of data transition in-the VBV buffer needs to be as indicated by a solid line in FIG. 12 so that the data volume shifts within the limited range of the VBV buffer. However, in the TM5 rate control algorithm, since the target bit quantity is determined to shift in an area close to the maximum value of the VBV buffer, limitation of the usable range alone will cause transition of the VBV buffer in an unusable range, as indicated by a dotted line in FIG. 12.

Thus, it can be considered to increase the quantity of generated bits by stuffing by the quantity of generated bits of the first I-picture, when the usable range of the VBV buffer is limited. In this way, however, the quantity of generated bits of the first I-picture increases. Therefore, when the remaining bit quantity R(j) in the GOP is updated in accordance with the equation (16) (that is, R(j+1)=R(j)−S(j)), the bit quantity R(j+1) allocated to the remaining non-coded pictures becomes a very small value, and the locus of the VBV buffer will return to the unusable upper range in FIG. 12.

Figure 13:
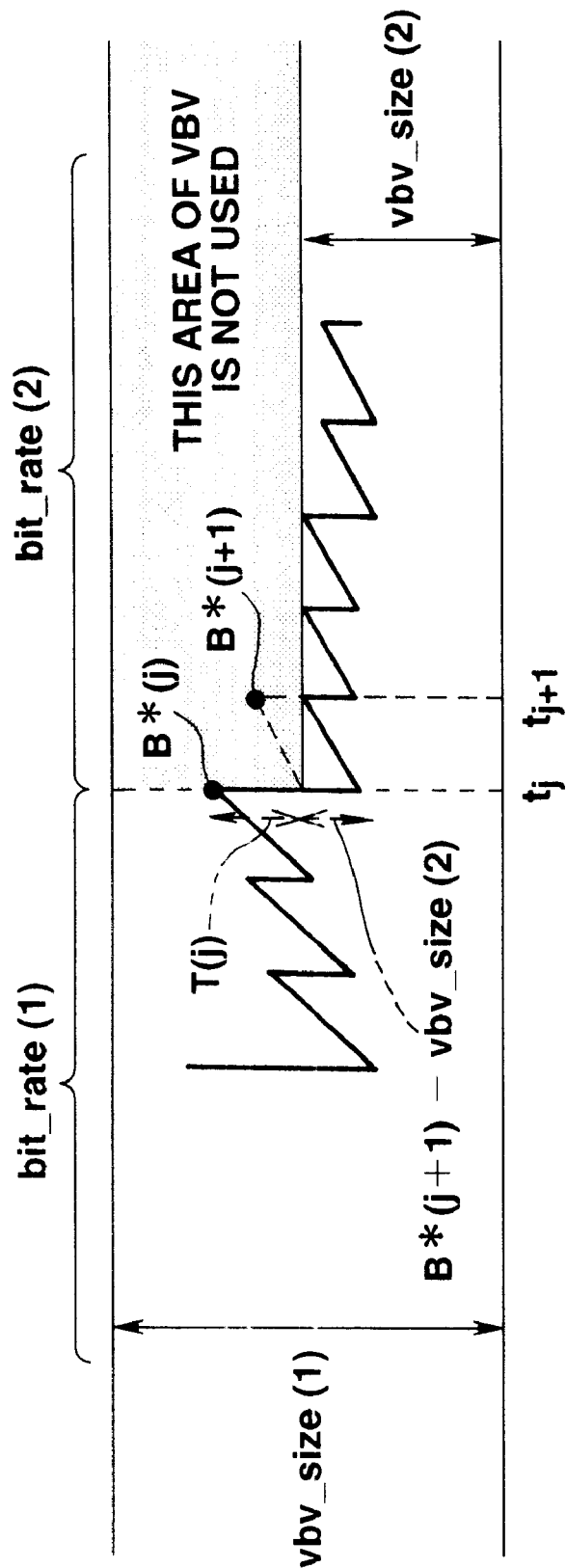
FIG. 13 illustrates changes of the capacity of the VBV buffer.

Thus, at step S3, the value of the buffer occupancy quantity B*(j+1) calculated in accordance with the equation (12) and the value of the capacity vbv_size(2) of the VBV buffer calculated in accordance with the equation (13) are compared with each other. If B*(j+1) is greater than vbv_size(2), the target bit quantity T(j) calculated at step S1 is corrected at step S4 by the difference (B*(j+1)−vbv_size (2)) as shown in the equation (15). As a result, the corrected target bit quantity T(j) has a value smaller than the capacity vbv_size(2) of the VBV buffer by the difference (B*(j+1)−vbv_size(2)) as shown in FIG. 13, and the unusable range of the VBV buffer is prevented from being used.

Figure 6:
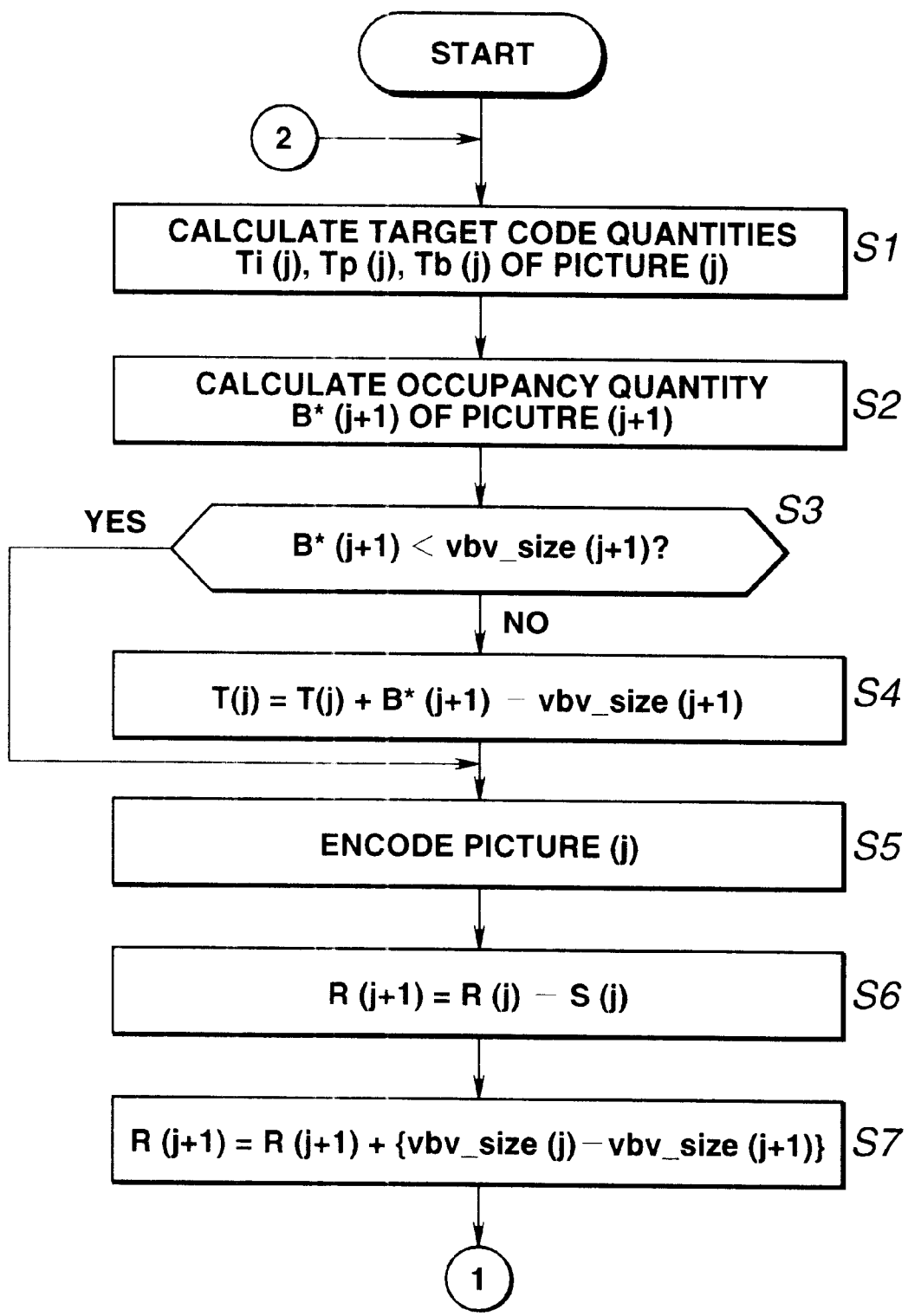
FIG. 6 is a flowchart for explaining the operation of the image coding device 2-1 of FIG. 5.
Figure 7:
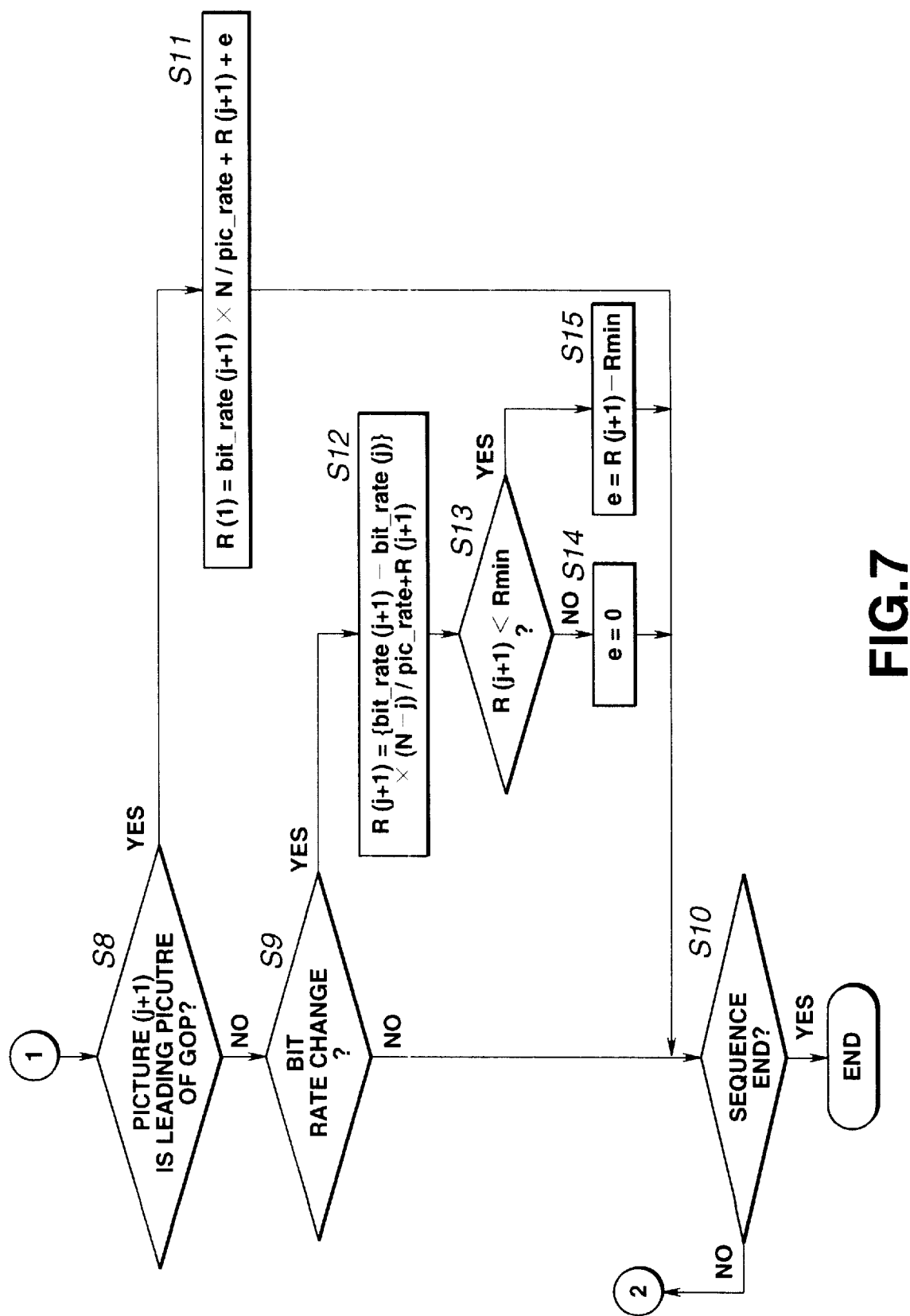
FIG. 7 is a flowchart for explaining the operation of the image coding device 2-1 of FIG. 5.

After the processing for limiting the usable range of the VBV buffer is carried out as described above, processing of step S8 and subsequent steps of the flowchart of FIG. 7 continuing from FIG. 6 is carried out. In this case, processing in the case where the bit rate is changed at a halfway point in the GOP is carried out.

The target bit quantity setting circuit 32 determines at step S8 whether the picture (j+1) is the leading picture of the GOP or not. In short, it determines whether (j+1) is 1 or not. If the picture (j+1) is not the leading picture of the GOP, the processing goes to step S9 and the target bit quantity setting circuit 32 determines whether or not a change of the bit rate in that GOP is designated by the controller 3. If a change of the bit rate is not designated, the processing goes to step S10 and the target bit quantity setting circuit 32 determines whether the processing target has reached the sequence end or not. If the sequence end has not been reached, the processing returns to step S1 and the subsequent processing is repeatedly carried out. If it is determined that the processing target has reached the sequence end, the processing ends.

If it is determined at step S9 that a change of the bit rate is designated, the target bit quantity setting circuit 32 goes to step S12 and corrects the bit quantity R(j+1) corrected at step S7, using a value obtained by multiplexing the number of remaining pictures (N−j) of the GOP by the difference in bit quantity per picture (bit_rates(j+1)−bit_rates(j))/pic_rate, in accordance with the following equation.

$$R(j+1)=\{bit\_rate(j+1)-bit\_rate(j)\}\times(N-j)/pic\_rate+R(j+1) \quad (19)$$

Figure 14:
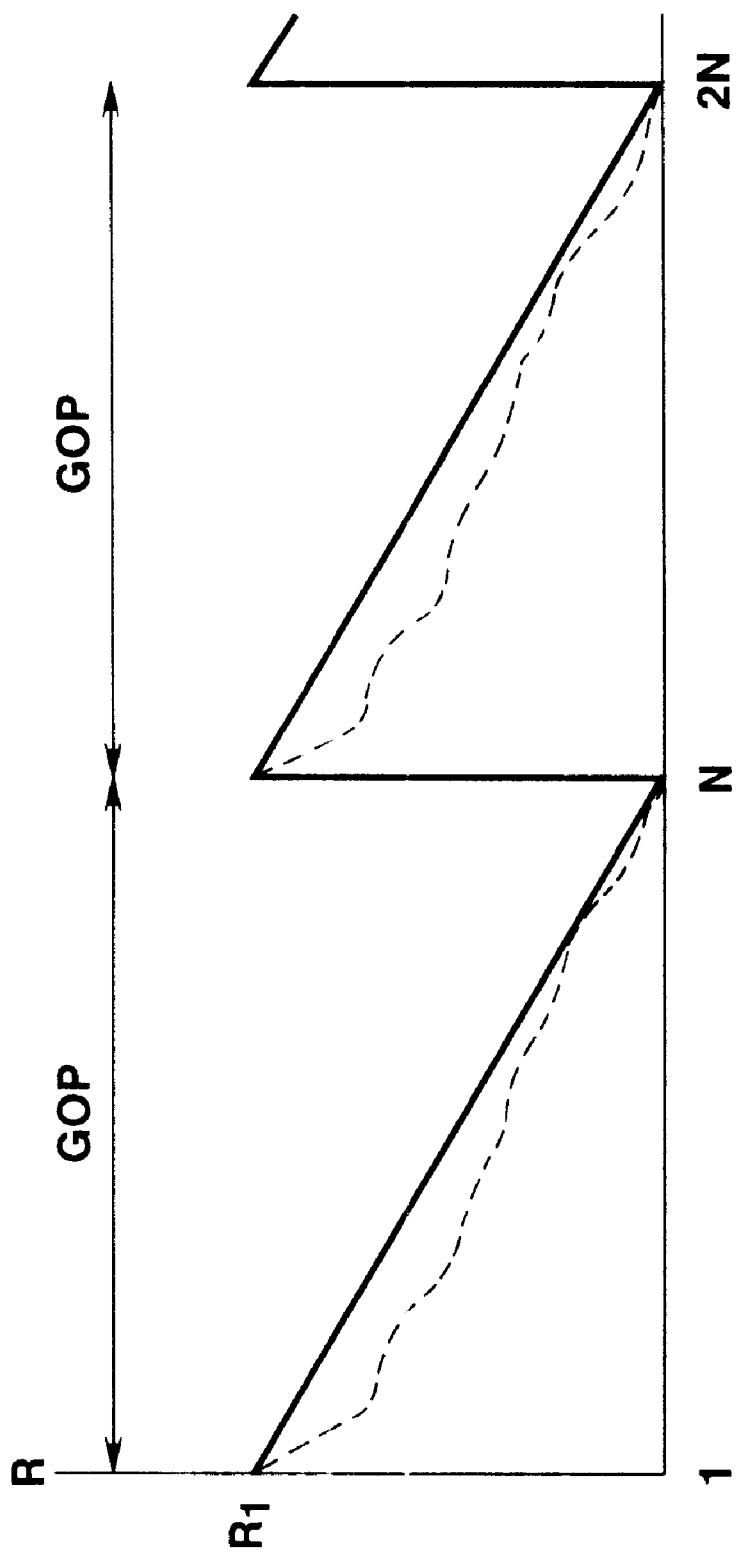
FIG. 14 illustrates changes of the bit quantity R.

That is, if the bit rate is not changed at a halfway point in the GOP, the bit quantity R is gradually reduced from the initial value R1 as encoding proceeds, as shown in FIG. 14. In FIG. 14, a solid line indicates the case where it is assumed that the respective pictures are encoded with the equal bit quantity. Actually, since the quantity of generated bits of I-picture or P-picture is greater than that of B-picture, the bit quantity R changes as indicated by a dotted line.

On the other hand, if a change of the bit rate is required at the next picture (j+1) after encoding the picture (j) of the GOP, the bit quantity R(j) allocated to non-coded pictures following the picture (j) is corrected at step S12 as expressed by the equation (19). Specifically, though the bit quantity R allocated to the remaining non-coded pictures has been controlled to be gradually reduced from the initial value R1 at the first bit rate bit_rate(j+1), the bit quantity R(j+1) is corrected at the timing of the picture (j+1).

This corrected bit quantity R(j+1) is equal to the bit quantity R(j+1) of the picture (j+1) in the case where the pictures from the leading picture of the GOP are encoded at the second bit rate bit_rate(j+1) with an initial value of R2.

In other words, in coding the picture (j+1) as a picture at a halfway point in the GOP, when the bit rate is changed from the first bit rate to the second bit rate, the bit quantity allocated to the non-coded pictures of the picture (j+1) and the subsequent pictures is corrected as if coding processing had been carried out at the second bit rate from the leading picture (j) of the GOP.

Next, the processing goes to step S13 and the target bit quantity setting circuit 32 determines whether or not the bit quantity R(j+1) corrected at step S12 is smaller than a predetermined minimum value Rmin. If the bit quantity R(j+1) is equal to or greater than the minimum value Rmin, 0 is set as the correction value "e", at step S14. If the bit quantity R(j+1) is smaller than the minimum value Rmin, the difference (R(j+1)−Rmin) between the bit quantity R(j+1) and the minimum value Rmin is set as the correction value "e", at step S15. This correction value "e" is used at step S11. The function of this correction value "e" will be described later.

After the processing of step S14 or step S15, the processing goes to step S10 and the subsequent processing is repeatedly carried out.

If it is determined at step S8 that the coding target picture (j+1) is the leading picture of the GOP, the processing goes to step S11 and the target bit quantity setting circuit 32 corrects the bit quantity R(j+1) in accordance with the following equation. In short, the bit quantity R(1) allocated to non-coded pictures including the leading picture (1) of the GOP and the subsequent pictures is calculated by the following equation.

$$R(1)=bit\_rate(j+1)\times N/pic\_rate+R(j+1)+e \quad (20)$$

This bit_rate(j+1) expresses the new bit rate set with respect to the picture (j+1), and R(j+1) expresses the result of arithmetic operation in accordance with the equation (16) for the last picture (N) of the previous GOP.

After that, the processing returns to step S10 and the subsequent processing is repeatedly carried out.

The function of the correction value "e" will now be described. In the case where the bit quantity R(j+1) corrected by the equation (19) at step S12 is smaller than the predetermined minimum value Rmin, if the bit rate of the next GOP is controlled while this R(j+1)<Rmin is left as it is, there is a risk that the VBV buffer will overflow.

Figure 16:
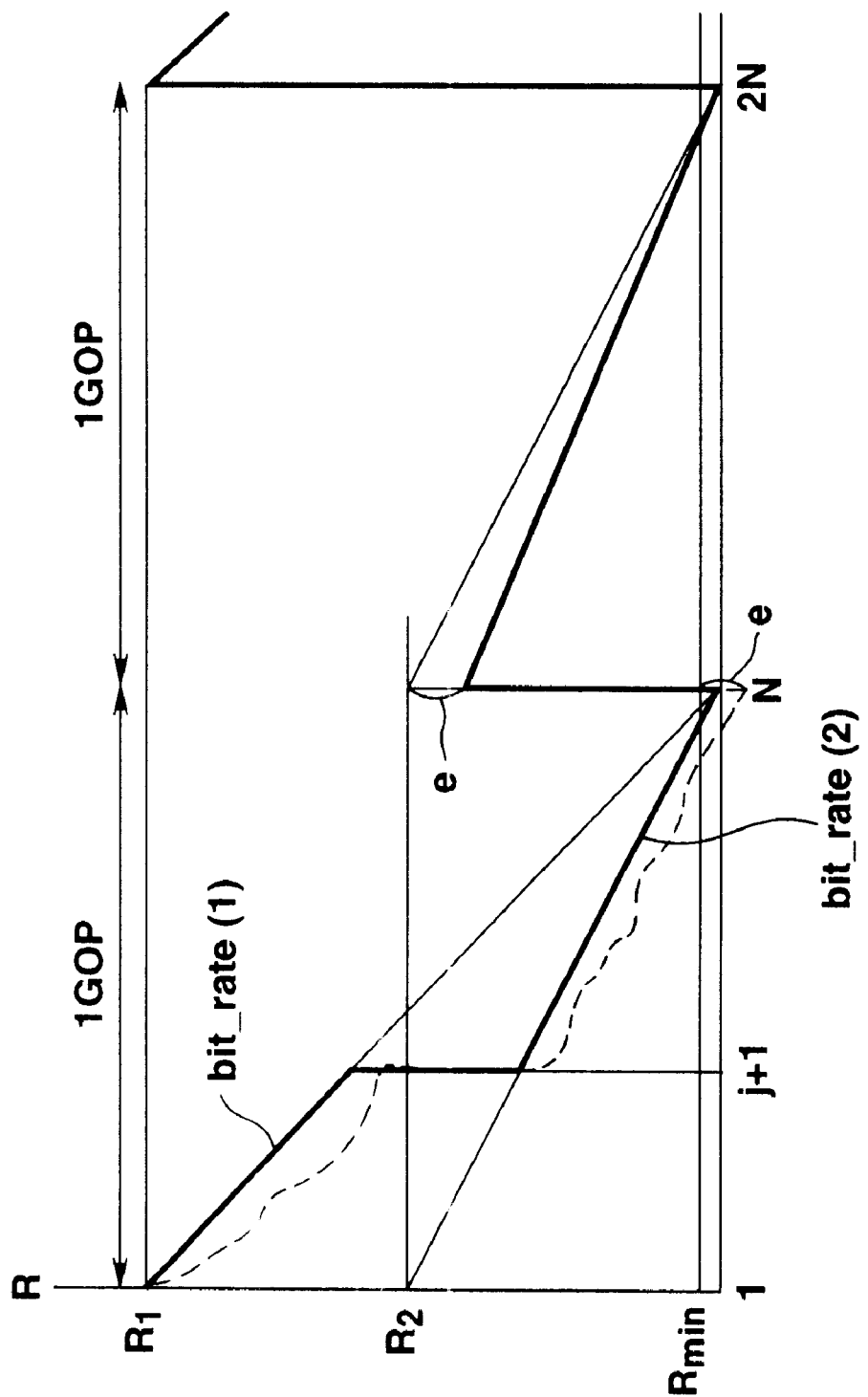
FIG. 16 illustrates the function of a value "e" of step S11 of FIG. 7.

Thus, a change of the bit rate at a halfway point in the GOP is designated. If R(j+1) is smaller than the minimum value Rmin at the point when the last picture (N-th picture) of the GOP is encoded, the initial value R2 of the bit quantity R for the next GOP is reduced by the difference "e" and the bit quantity for that GOP is set with an initial value of R2-e, as shown in FIG. 16. Thus, overflow of the VBV buffer is prevented.

In the above description, in each image coding device 2-i, the program Pi is statistically multiplexed by feeding back the global complexity Ci of actually coded data to the controller 3. However, the bit rate can also be controlled by feed-forward control. FIG. 17 shows an exemplary structure of such case. The structure of an image multiplexing system 1 shown in FIG. 17 is basically similar to that of the image multiplexing system 1 shown in FIG. 4 except that the coding difficulty Di, instead of the global complexity Ci, is outputted from each image coding device 2-i to the controller 3. The other parts of the structure are similar to those of FIG. 4.

The coding difficulty is an index indicating the quantity of bits generated as a result of coding processing. If the image of the coding target picture is complicated or highly dynamic, this coding difficulty is high. If the image of the coding target picture is simple or less dynamic, the coding difficulty is low.

Figure 17:
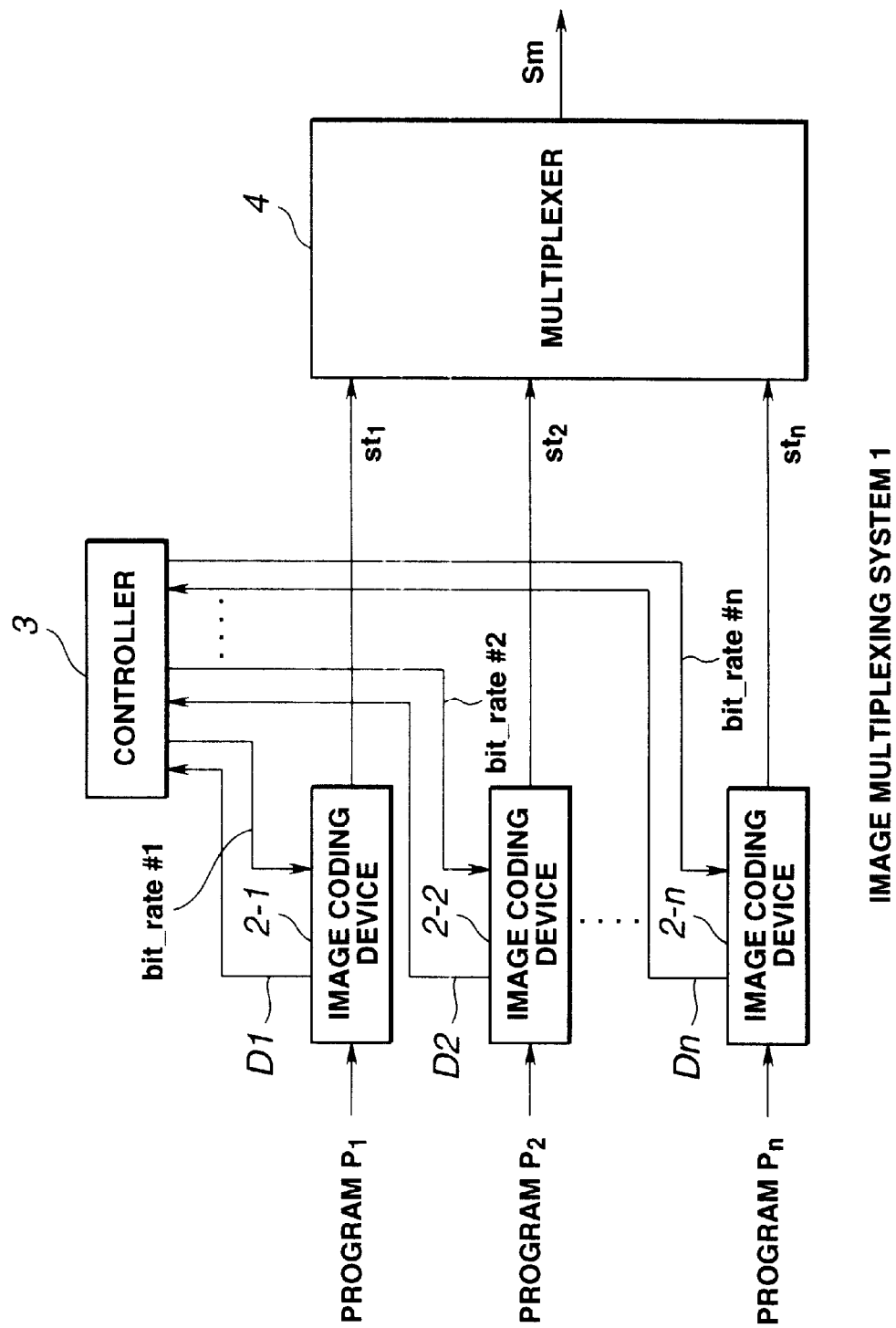
FIG. 17 is a block diagram showing another exemplary structure of the image multiplexing system to which the present invention is applied.
Figure 18:
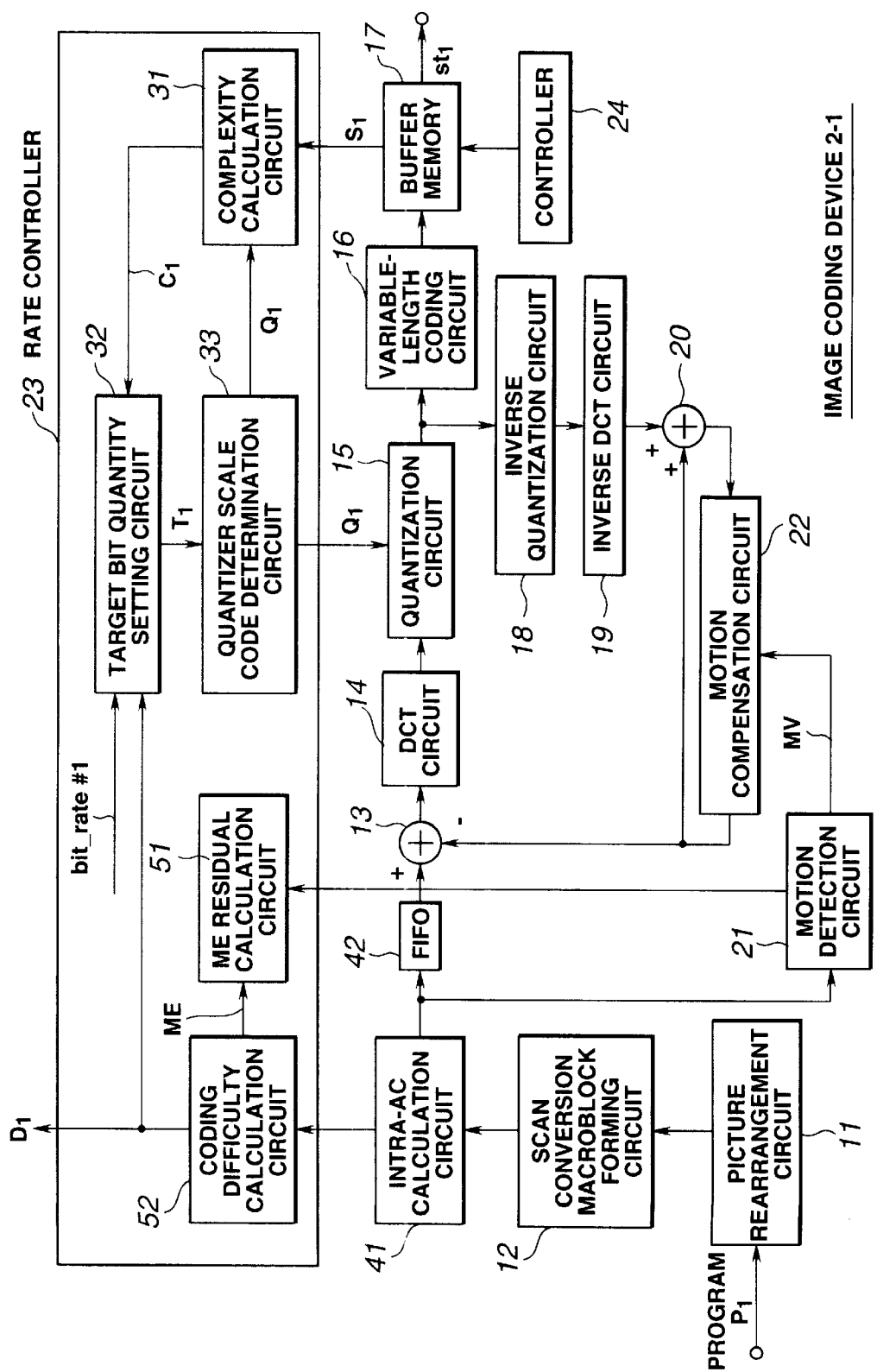
FIG. 18 is a block diagram showing an exemplary structure of an image coding device 2-1 of FIG. 17.

FIG. 18 shows an exemplary structure of the image coding device 2-1 of FIG. 17. (Although not shown, the image coding devices 2-2 to 2-n have the same structure as that of the image coding device 2-1 .) The basic structure is similar that of FIG. 5. However, in the exemplary structure of FIG. 18, an intra-AC calculation circuit 41 and a FIFO (first in first out) 42 are provided between the scan conversion macroblock forming circuit 12 and the subtracter 13. Also, an ME residual calculation circuit 51 and a coding difficulty calculation circuit 52 are additionally provided in the rate controller 23.

The intra-AC calculation circuit 41 receives the output of the scan conversion macroblock forming circuit 12, then calculates intra-AC in I-picture, and outputs the calculated intra-AC to the coding difficulty calculation circuit 52. The intra-AC calculation circuit 41 also outputs image data supplied from the scan conversion macroblock forming circuit 12 to the FIFO 42. The FIFO 42 delays the inputted image data at least by the time corresponding to the time required for the target bit quantity setting circuit 32 to set the target bit quantity, and outputs the delayed image data to the subtracter 13.

The ME residual calculation circuit 51 calculates an ME residual based on ME residual data outputted by the motion detection circuit 21 and outputs the calculated ME residual to the coding difficulty calculation circuit 52. The ME residual is a value obtained by adding the absolute value or the square value of a motion prediction error to the entire picture. The ME residual data is data for finding the ME residual.

The coding difficulty calculation circuit 52 calculates the coding difficulty D1 expressing the difficulty of coding of the picture on the basis of the ME residual calculated by the ME residual calculation circuit 51 and the intra-AC calculated by the intra-AC calculation circuit 41. The coding difficulty calculation circuit 52 transmits the coding difficulty D1 to the controller 3 and to the target bit quantity setting circuit 32. In this exemplary structure, since the coding difficulty D1 calculated by the coding difficulty calculation circuit 52 is transmitted to the controller 3, the global complexity C1 arithmetically found by the complexity calculation circuit 31 is not supplied to the controller 3.

The other parts of the structure of the image coding device 2-1 shown in FIG. 18 is similar to those of FIG. 5.

The operation of the image coding device 2-1 of FIG. 18, mainly of the structure different from that of FIG. 5, will now be described. The intra-AC calculation circuit 41 calculates intra-AC from the image data outputted from the scan conversion macroblock forming circuit 12. The intra-AC means the absolute value sum of the difference between the pixel value of each pixel in a macroblock of 8×8 pixels and the average value of the pixel values in the macroblock in I-picture. The intra-AC is expressed by the following equation.

$$\text{Intra\_AC} = \Sigma |f\text{curr}(x,y) - (\Sigma f\text{cirr})/N| \quad (21)$$

In this equation, Intra_AC expresses intra-AC, and fcurr (x,y) expresses the pixel value of each pixel in the macroblock. $\Sigma$fcurr(x,y) expresses the sum of the pixel values in the macroblock, and N expresses the number of pixels in the macroblock. $\Sigma$ expresses the sum with respect to the individual pixels in the macroblock.

In finding the motion vector, the motion detection circuit 21 outputs the absolute value sum (or square sun) of the difference in pixel value between macroblocks having the minimum value, as the ME residual data to the ME residual calculation circuit 51. The ME residual calculation circuit 51 adds the ME residual data from the motion detection circuit 21 to the entire picture and calculates the ME residual. That is, arithmetic operation is carried out by the ME residual calculation circuit 51 in accordance with the following equation.

$$\text{ME\_reside} = \Sigma |f_j(x,y) - f_{j-1}(x,y)| \quad (22)$$

In the above equation, ME reside expresses the ME residual, and fj(x, y) and fj-1(x,y) express the pixel values of the respective macroblocks. $\Sigma$ expresses the sum with respect to the individual pixels in the macroblock.

The coding difficulty calculation circuit 52 calculates the coding difficulty on the basis of the intra-AC supplied from the intra-AC calculation circuit 41 and the ME residual supplied from the ME residual calculation circuit 51. The coding difficulty expresses the difficulty of coding of the picture. In other words, it is the ratio of data quantity necessary for maintaining the same picture quality in coding. The intra-AC expresses complexity of the pattern, and the ME residual expresses quickness of motion of the image and complexity of the pattern. Since these intra-AC and ME residual have strong correlation with the coding difficulty, these are used as variables. For example, the coding difficulty D1 is calculated by the coding difficulty calculation circuit 52 using a linear function.

Thus, the coding difficulty with high precision is calculated on the basis of the pre-read statistical quantity (intra-AC). The controller 3 determines the target bit rate bit_rate#i on the basis of the coding difficulty Di and outputs the determined bit rate to the image coding device 2-i.

The operation of the target bit quantity setting circuit 32 and the controller 24 of FIG. 18 will now be described with reference to the flowcharts of FIGS. 19 and 20. The processing of steps S31 to S37 is basically similar to the processing of steps S1 to S7 shown in FIG. 6. However, at step S31, the target bit quantity T(j) of the picture (3) is calculated in accordance with the following equation, instead of the equations (4) to (6). In the following equation (23), subscripts "i", "p" and "b" corresponding to the picture types are omitted.

$$T(j) = \max\left\{ R'(j) \times \frac{D_j}{\sum_{K=j}^{j+N-1} D_k}, \text{bit\_rate}(j)/(8 \times \text{pic\_rate}) \right\} \quad (23)$$

In this equation, T(j) expresses the target bit quantity of the processing target picture (j), and R'(j) expresses the bit quantity allocated to fixture L pictures from the processing target picture (j). Dj expresses the coding difficulty of the picture (j). That is, in accordance with the above equation, the target bit quantity T(j) of the picture (j) is found by weighting the bit quantity R'(j) allocated to the pre-read L pictures by the ratio of the coding difficulty Dj of that picture and the sum of the coding difficulty Dj of pre-read N pictures.

The processing of steps S32 to S35 is similar to the processing of steps S2 to S5 of FIG. 6 and therefore will not be described further in detail. At step S36, the bit quantity R'(j+1) allocated to the future L pictures from the processing target picture (j+1) is calculated in accordance with the following equation (24), instead of the equation (16).

$$R'(j+1) = R'(j) - S(j) + F(j+L) \quad (24)$$

In the equation (24), R'(j) expresses the bit quantity allocated to the future L pictures from the picture (j). S(j) expresses the quantity of generated bits of the picture (j). F(j+L) expresses the predictive bit quantity allocated to the picture (j+L) as the L-th future picture from the picture (j+1).

The initial value of R'(j) is expressed by the following equation in accordance with the bit quantity of the pre-read L pictures.

$$R'(1) = \text{bit\_rate}(1) \times L/\text{pic\_rate} \quad (25)$$

In the equation (24), F(j+L) expresses the bit quantity corresponding to the picture type of the pictures (j+L) as the L-th future picture from the picture (j+1) and is prescribed, for example, by the following equations. In the equation (24), subscripts "i", "p" and "b" corresponding to the picture types in the following equations (26) to (28) are omitted.

$$F_i(j+L) = \frac{G(j+L)}{1 + \frac{N_p X_p}{X_i K_p} + \frac{N_b X_b}{X_i K_b}} \quad (26)$$

$$F_p(j+L) = \frac{G(j+L)}{N_p + \frac{N_b K_p X_b}{K_b X_p}} \quad (27)$$

$$F_b(j+L) = \frac{G(j+L)}{N_b + \frac{N_p K_b X_p}{X_i K_p X_b}} \quad (28)$$

In the above equations, G expresses the bit quantity allocated to the future non-coded pictures of the picture (j+L) and the subsequent pictures in the GOP including the picture (j+L), and corresponds to the bit quantity R in the feedback rate control system shown in FIGS. 4 and 5. This bit quantity G is also updated in accordance with the following equation, at step S36.

$$G(j+L+1)=G(j+L)-F(j+L) \quad (29)$$

F(j+L) in the equation (29) is expressed by the equation of the corresponding picture type, from among the equations (26) to (28).

Figure 21:
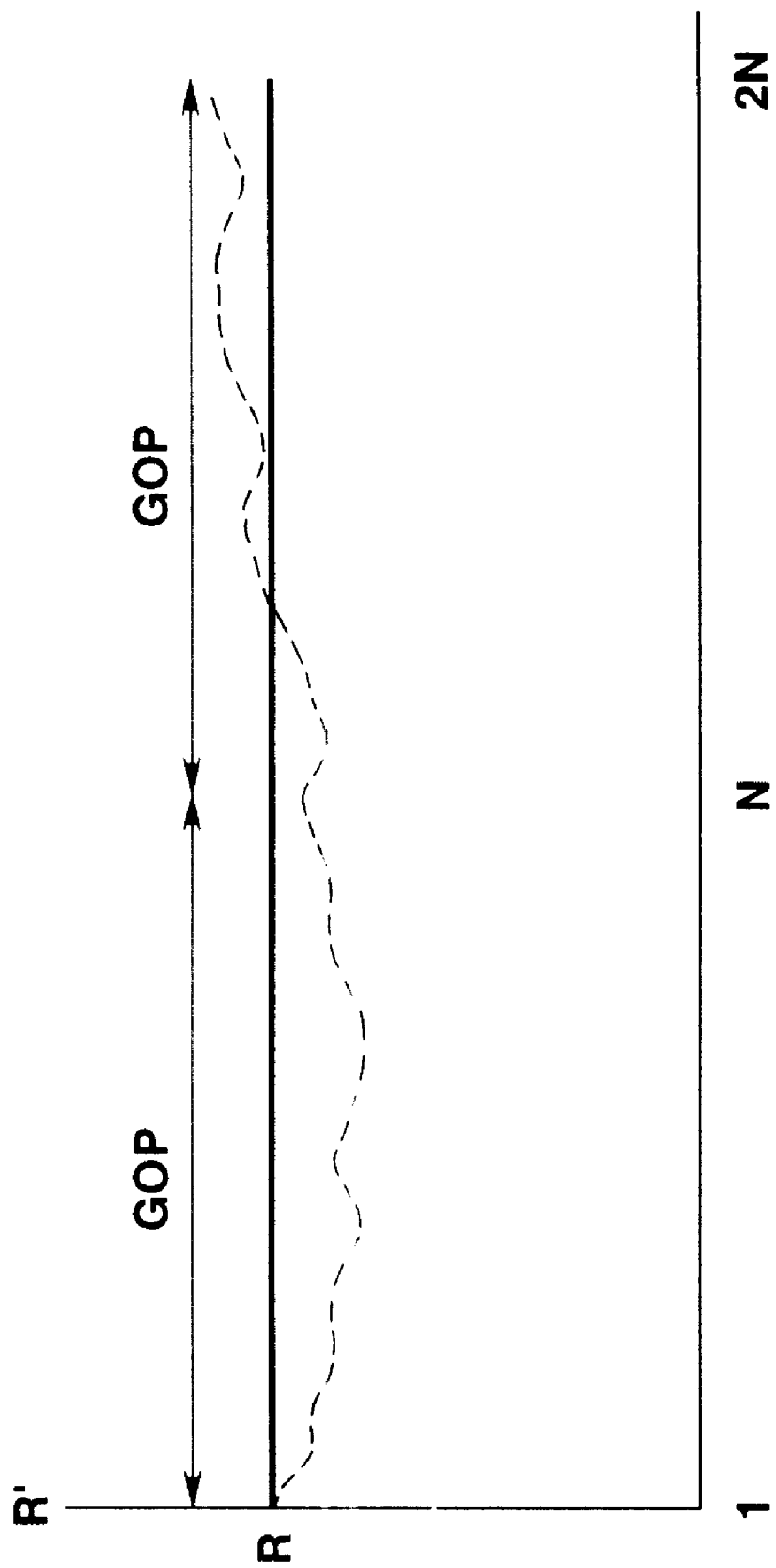
FIG. 21 illustrates changes of the bit quantity R'.

Since the bit quantity R' expresses the bit quantity of the L pictures to be coded from now, basically, the bit quantity R' has a constant value as indicated by a solid line in FIG. 21 regardless of the proceeding status of encoding. Actually, however, since the bit quantity changes for each picture type, the value varies around the value indicated by the solid line, as indicated by a broken line in FIG. 21.

Figure 22:
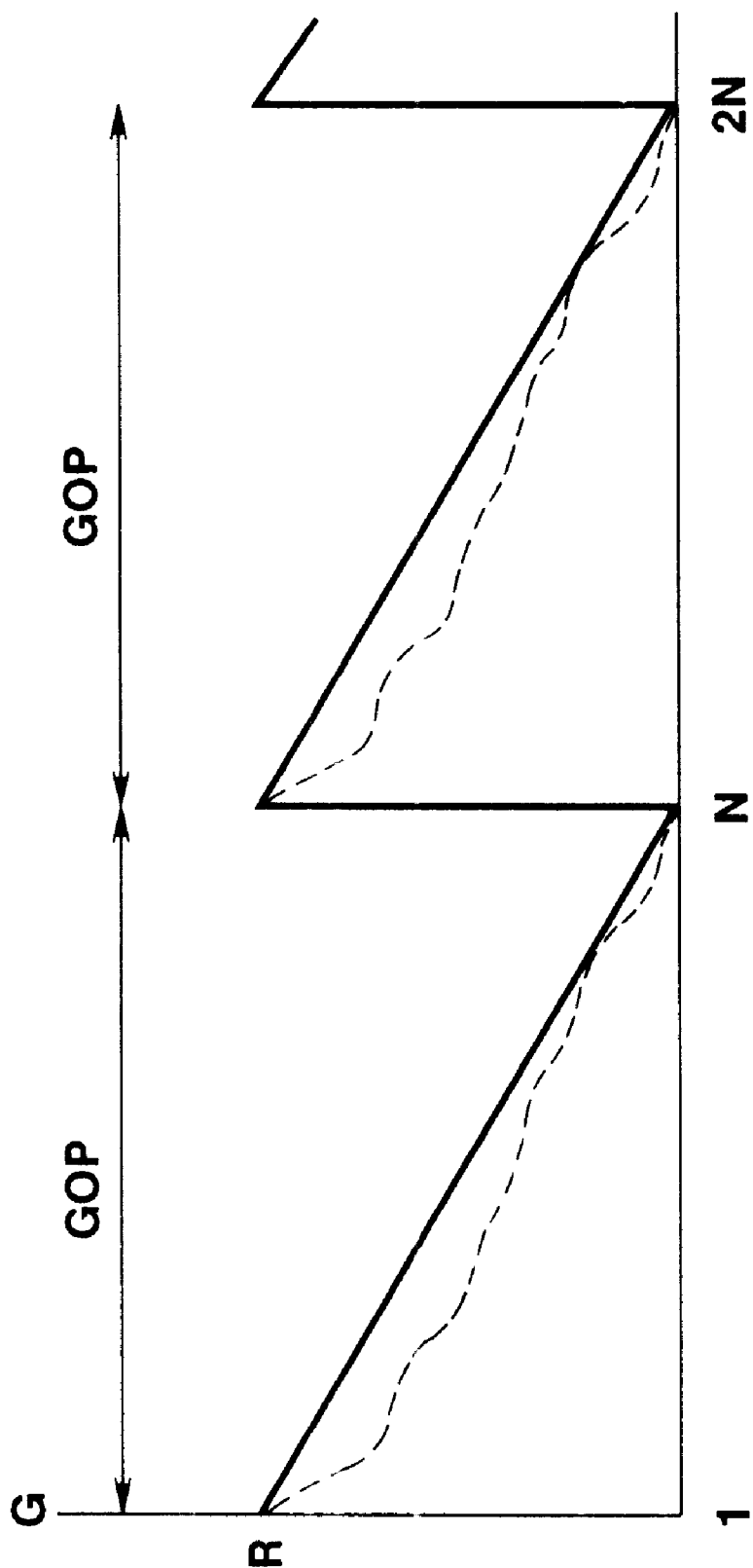
FIG. 22 illustrates changes of the bit quantity G.

On the contrary, the bit quantity G is the bit quantity allocated to the non-coded pictures in the GOP. Therefore, the value of the bit quantity G is gradually reduced along with the proceeding of encoding and is reset at the beginning of the GOP, as shown in FIG. 22, similarly to the bit quantity R in the feedback rate control.

Next, at step S37, updating processing of the bit quantity R'(j+1) is carried out in accordance with the following equation (30), instead of the equation (17) at step S7 of FIG. 6.

$$R'(j+1)=R'(j+1)+\{vbv\_size(j)-vbv\_size(j+1)\} \quad (30)$$

The above-described processing of steps S31 to S37 is the processing carried out for limiting the usable range of the VBV buffer, as described in the example of feedback rate control.

Next, the processing goes to step S38 and the target bit quantity setting circuit 32 determines whether the picture (j+1) is the leading picture of the GOP or not. If the picture (j+1) is not the leading picture of the GOP, the processing goes to step S39 and it is determined whether a change of the bit rate at a halfway point in the GOP is designated or not. If a change of the bit rate is not designated, the processing goes to step S40 and it is determined whether the encoding processing has reached the sequence end or not. If the sequence end has not been reached, the processing returns to step S31 and the subsequent processing is repeatedly carried out. If it is determined at step S40 that the processing has reached the sequence end, the processing ends.

If it is determined at step S39 that a change of the bit rate at a halfway point in the GOP is designated, the processing goes to step S41 and the target bit quantity setting circuit 32 corrects the bit quantity R'(j+1) and the bit quantity G(j+1) in accordance with the following equation.

$$R'(j+1)=\{bit\_rate(j+1)-bit\_rates)\}\times L/pic\_rate(j+R'(j+1) \quad (31)$$

$$G(j+1)=\{bit\_rates(j+1)-bit\_rate)\}\times(N-j)/pic\_rate+G(j+1) \quad (32)$$

In the above equations, bit_(j) expresses the first bit rate designated in coding the pictures up to the picture (j), and bit_rate(j+1) expresses the second bit rate designated in coding the pictures from the picture (j+1). L expresses the number of pictures for which the coding difficulty is calculated prior to coding processing (that is, the number of pictures for which the coding difficulty is pre-read). N expresses the number of pictures included in the GOP.

Figure 23:
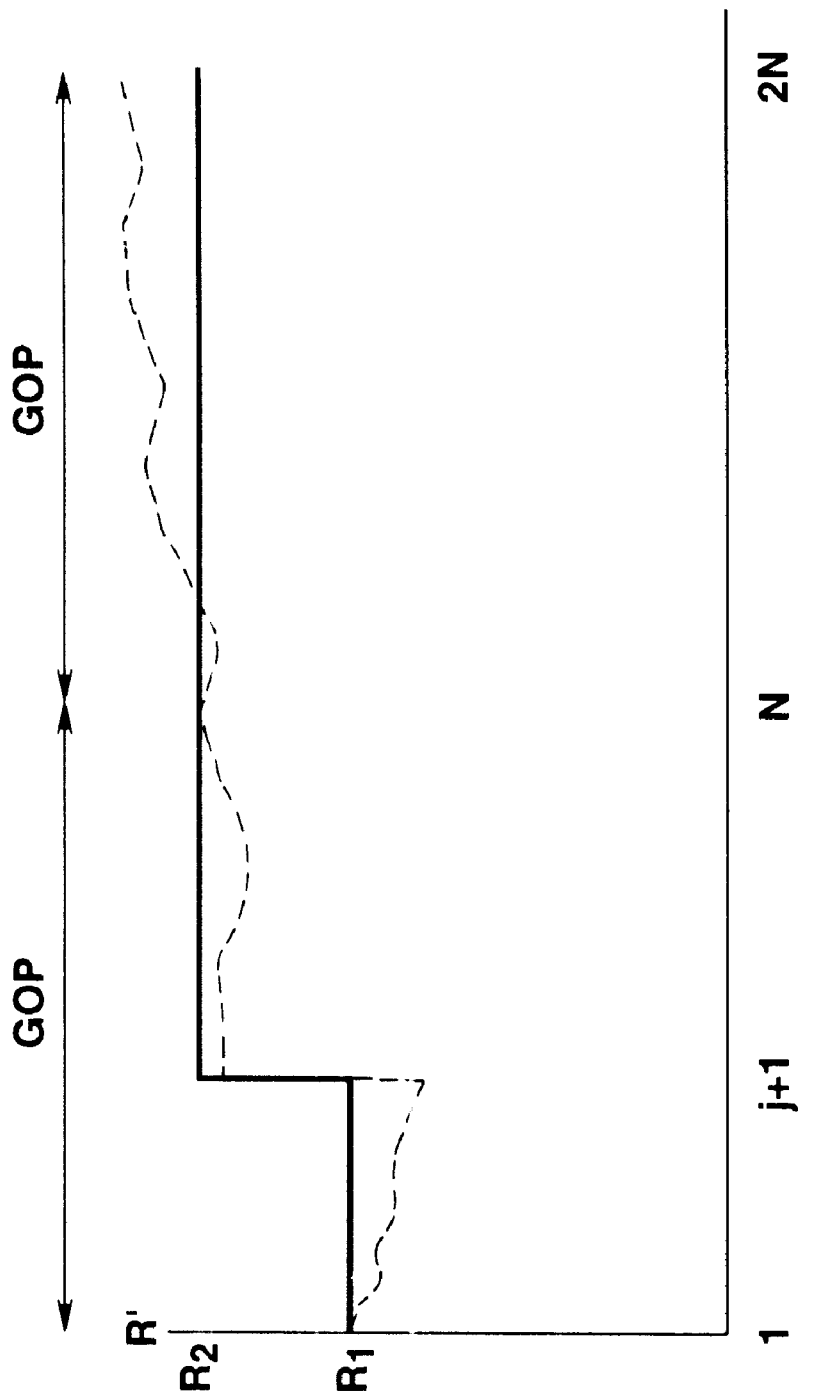
FIG. 23 illustrates changes of the bit quantity R' in the case where the bit rate is changed at a halfway point of GOP.

In the case where the bit rate is thus changed from the first bit rate to the second bit rate at a halfway point in the GOP, the bit quantity R' allocated to the predetermined number (L) of pictures is corrected from the value R1 corresponding to the first bit rate to the value R2 corresponding to the second bit rate, as shown in FIG. 23. In short, the bit quantity R' allocated to the non-coded pictures up to the L future pictures including the coding target picture is corrected as if coding processing had been carried out at the newly set second bit rate. Specifically, as understood from the equation (31), the bit quantity R' is corrected using the value obtained by multiplying the difference in bit quantity per picture by the number of L pictures for which the coding difficulty is pre-read.

Figure 15:
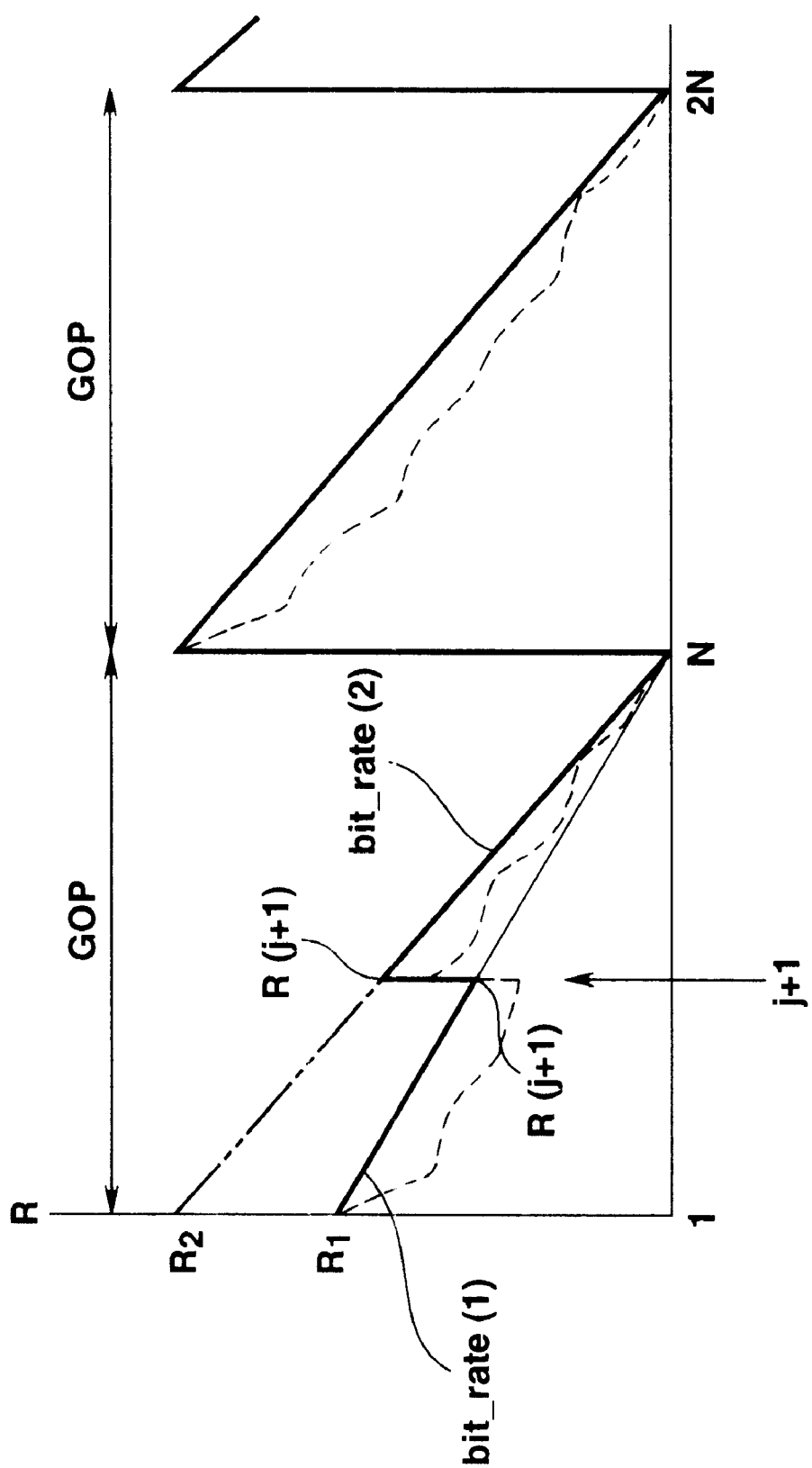
FIG. 15 illustrates changes of the bit quantity R in the case where the bit rate is changed at a halfway point of GOP.
Figure 24:
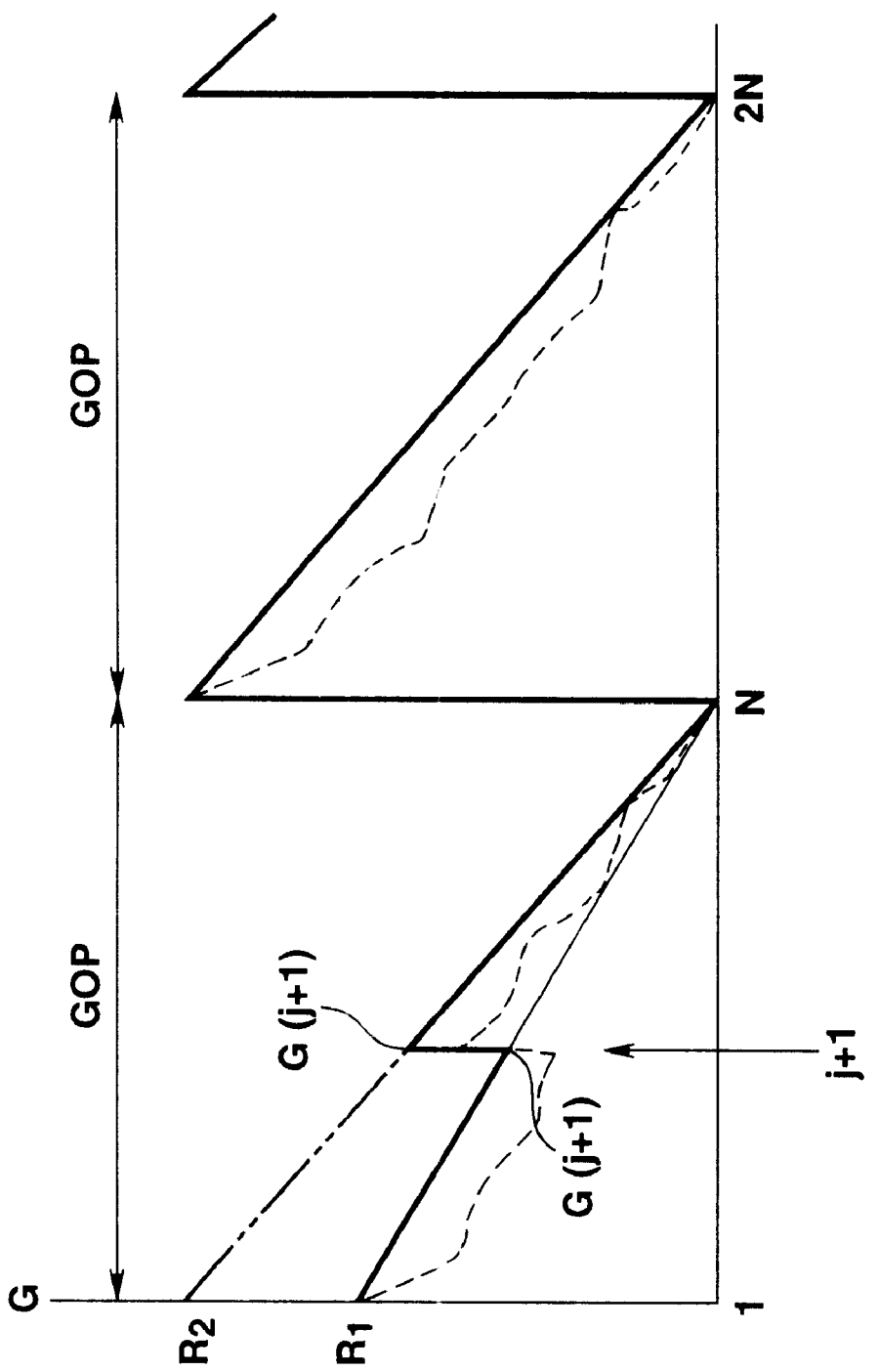
FIG. 24 illustrates changes of the bit quantity G in the case where the bit rate is changed at a halfway point of GOP.

On the other hand, the bit quantity G allocated to the non-coded pictures including the coding target picture in the GOP is changed from the value G(j+1) in the case where encoding is carried out at the bit rate bit_rate(1) to the value G(j+1) in the case where encoding is carried out with the initial value R2 from the beginning, as shown in FIG. 24. This is similar to the case of the bit quantity R which is described with reference to FIG. 15. In short, the bit quantity G can be corrected using the value obtained by multiplying the difference in bit quantity per picture by the number of non-coded pictures (N-j) in the GOP.

Next, the processing goes to step S42 and the target bit quantity setting circuit 32 determines whether or not the bit quantity G(j+1) allocated to the non-coded pictures of the picture (j+1) and the subsequent pictures in the GOP is smaller than a minimum value Gmin. If the bit quantity G(j+1) is equal to or greater than the minimum value Gmin, 0 is set as the correction value "e", at step S43.

If the bit quantity G(j+1) allocated to the non-coded pictures of the picture (j+1) and the subsequent pictures is smaller than the minimum value Gmin, the difference (G(j+1)-Gmin) between the bit quantity G(j+1) and the minimum value Gmin is set as the correction value "e", at step S44. This processing is similar to the processing of steps S13 to S15 of FIG. 7. This correction value "e" is used in the processing at step S46 or S47 as will be later described.

If it is determined at step S38 that the picture (j+1) as the coding target is the leading picture of the GOP (that is, (j+1) is (1)), the processing goes to step S45 and the target bit quantity setting circuit 32 determines whether a change of the bit rate is designated or not.

The presence or absence of a change of bit rate is determined here. Meanwhile, if it is determined at step S8 of FIG. 7 that the picture (j+1) is the leading picture of the GOP, bit rate change processing is not carried out. In the processing of FIG. 7, since the same equation (20) is used at step S11 regardless of whether the picture (j+1) is the leading picture of the GOP or not, determination of a change of the bit rate is not necessary. On the other hand, in the processing of the flowchart of FIG. 20, even when the picture (j+1) is the leading picture of the GOP, processing differs depending on the presence or absence of a change of the bit rate. Therefore, the determination processing of step S45 is inserted.

Specifically, if it is determined at step S45 that a change of the bit rate is not designated, the target bit quantity setting circuit 32 calculates the bit quantity G(1) allocated to the non-coded pictures including the first picture of the GOP, in accordance with the following equation at step S46.

$$G(1)=bit\_rate(j+1)\times N/pic\_rate+G(j+1)+e \quad (33)$$

If it is determined at step S45 that a change of the bit rate is designated, the processing goes to step S47 and the target bit quantity setting circuit 32 updates the bit quantity R'(1) allocated to the L-th non-coded picture from the first picture (1) of the GOP and the bit quantity G(1) allocated to the non-coded pictures including the first picture (1) of the GOP, in accordance with the following equations.

$$R'(1)=\{bit\_rate(j+1)-bit\_rate(j)\}\times L/pic\_rate+R'(j+1) \quad (34)$$

$$G(1)=bit\_rate(j+1)\times N/pic\_rate+G(j+1)+e \quad (35)$$

In the above equations, bit_rate(j) is the bit rate corresponding to the picture (j), and bit_rate(j+1) is the bit rate corresponding to the picture (j+1).

As is clear from comparison between the processing of step S46 and the processing of step S47, the processing of step S47 includes updating processing of the bit quantity R'(1) in addition to the processing of the bit quantity G(1).

Figure 25:
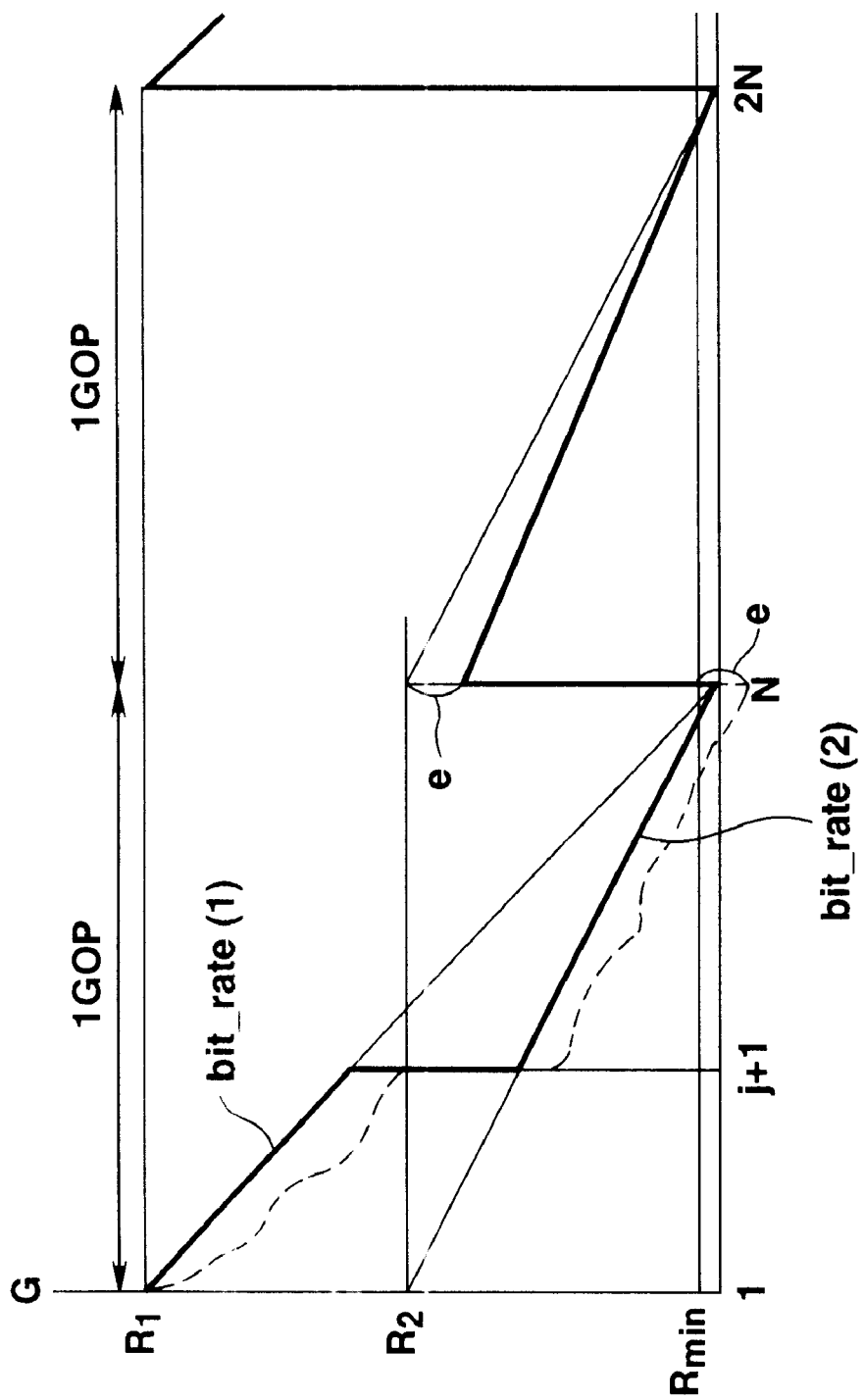
FIG. 25 illustrates the function of a correction value "e" at steps S46 and S47 of FIG. 20.

The function of the correction value "e" is similar to the function explained with reference to FIG. 16. As shown in FIG. 25, if the value of "e" is not 0 immediately after the last picture of the GOP is coded along with the change of the bit quantity G, the initial value R2 of the bit quantity G at the time of coding the next GOP is adjusted to a value smaller by the value of "e".

After the processing of steps S43, S44, S46 and S47, the processing goes to step S40 and the subsequent processing is repeatedly carried out.

Figure 26:
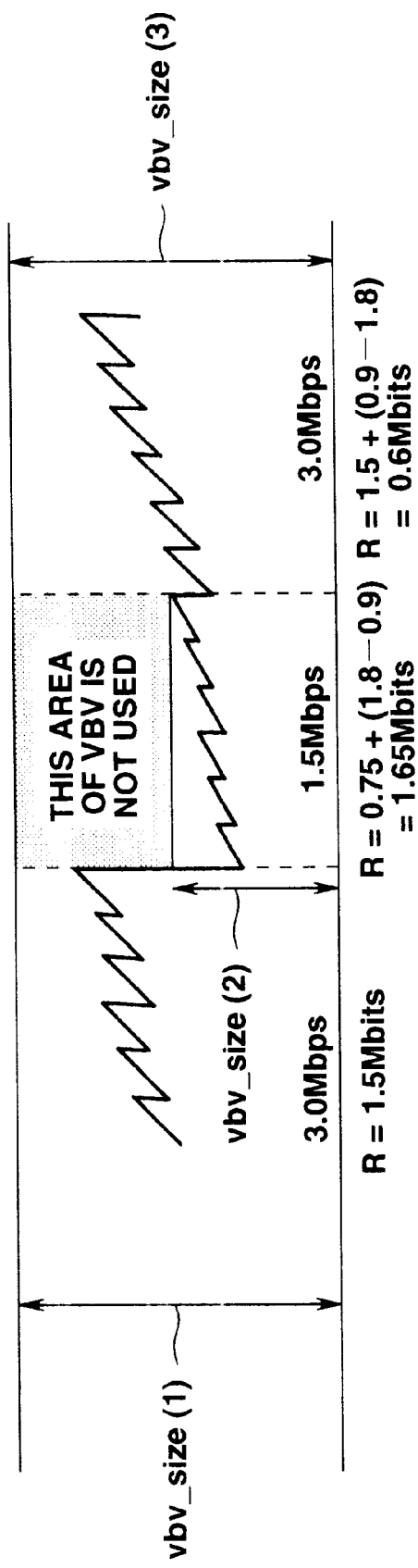
FIG. 26 illustrates a reversal phenomenon of the bit quantity R.

In both of the above-described embodiments of feedback bit rate control and feed-forward bit rate control, the usable range of the VBV buffer is limited. However, there may be some problems in consideration of the picture quality. Specifically, it is assumed that a bit rate of 3 Mbps is set in the first GOP while a bit rate of 1.5 Mbps is set in the second GOP, and that a bit rate of 3 Mbps is set again in the third GOP, as shown in FIG. 26. At this point, if the capacity of the VBV buffer is 1.8 Mbits and the threshold value bit_rate(0) is 3.0 Mbps, the delay time τmax is τmax=1.8/3.0= 0.6 (sec).

At this point, the initial value of the bit quantity R allocated to non-coded pictures in the GOP applied to the TM5 bit rate control algorithm in each GOP is found as follows from the formula of bit_rate×N/pic_rate. It is assumed that the number of GOPs N is 15 and that pic_rate is 30.

Specifically, in the first GOP, the initial value of the bit quantity R allocated to the non-coded pictures is 1.5 (=3.0× 15/30) Mbits. In the next GOP, the initial value is 0.75 (=1.5×15/30). However, while the VBV buffer capacity vbv_size (1) (of the previous GOP) before being corrected by the difference (vbv_(1)–vbv_size(2)) of the capacity of the VBV buffer in accordance with the equation (17) at step S7 of FIG. 6 is 1.8 (=τmax×bit_rate(1)=0.6×3.0), the VBV buffer capacity vbv_size(2) in the second GOP is 0.9 (=τmax×bit rate(2)=0.6×1.5). Consequently, the initial value R is 1.65 (=0.75+(1.8–0.9)) Mbits.

In the third GOP, the initial value is 1.5 (=3.0×15/30). However, while the capacity vbv_size(2) of the VBV buffer before changing is 0.9, the capacity vbv_size(3) in this GOP is 1.8. Therefore, the initial value R is 0.6 (=1.5+(0.9–1.8)) Mbits.

In the second GOP, though the bit rate is set at a small value of 1.5 Mbps since the picture has a pattern easy to encode, the initial value of the bit quantity R is set at a larger value of 1.65. In the third GOP, though the bit rate is set at a large value of 3.0 Mbps since the picture has a pattern difficult to encode, the initial value of the bit quantity R is set at a smaller value of 0.6 Mbps. That is, a reversal phenomenon is generated such that the initial value of the bit quantity R of the second GOP is large while the initial value of the bit quantity R of the last GOP is very small.

Figure 27:
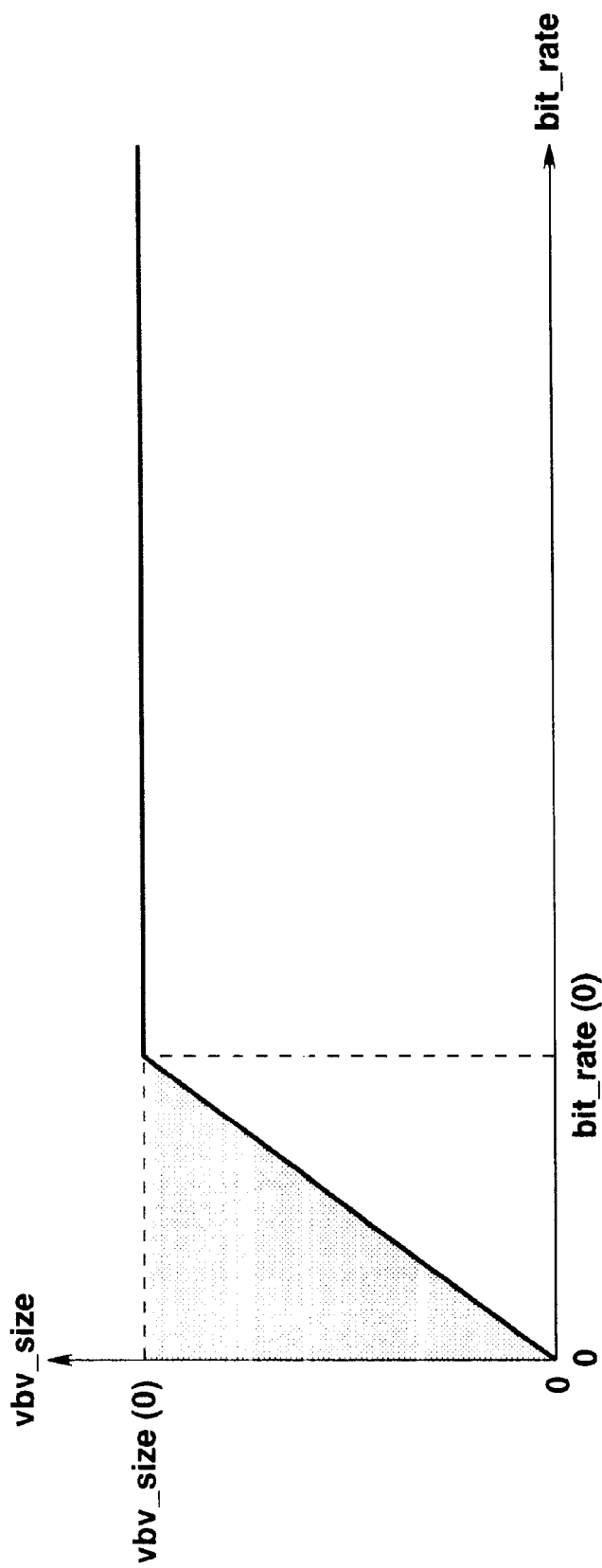
FIG. 27 illustrates a cause of the reversal phenomenon of the bit quantity R.

This reversal phenomenon is caused by the fact that the usable range of the capacity vbv_size of the VBV buffer is abruptly restricted when the value of the bit rate bit_rate becomes smaller than the threshold value bit_rate(0), as shown in FIG. 27. In FIG. 27, the horizontal axis represents the bit rate bit_rate and the vertical axis represents the capacity vbv_size of the VBV buffer. In FIG. 27, a shaded area represents an area where the use of the VBV buffer is restricted.

Figure 28:
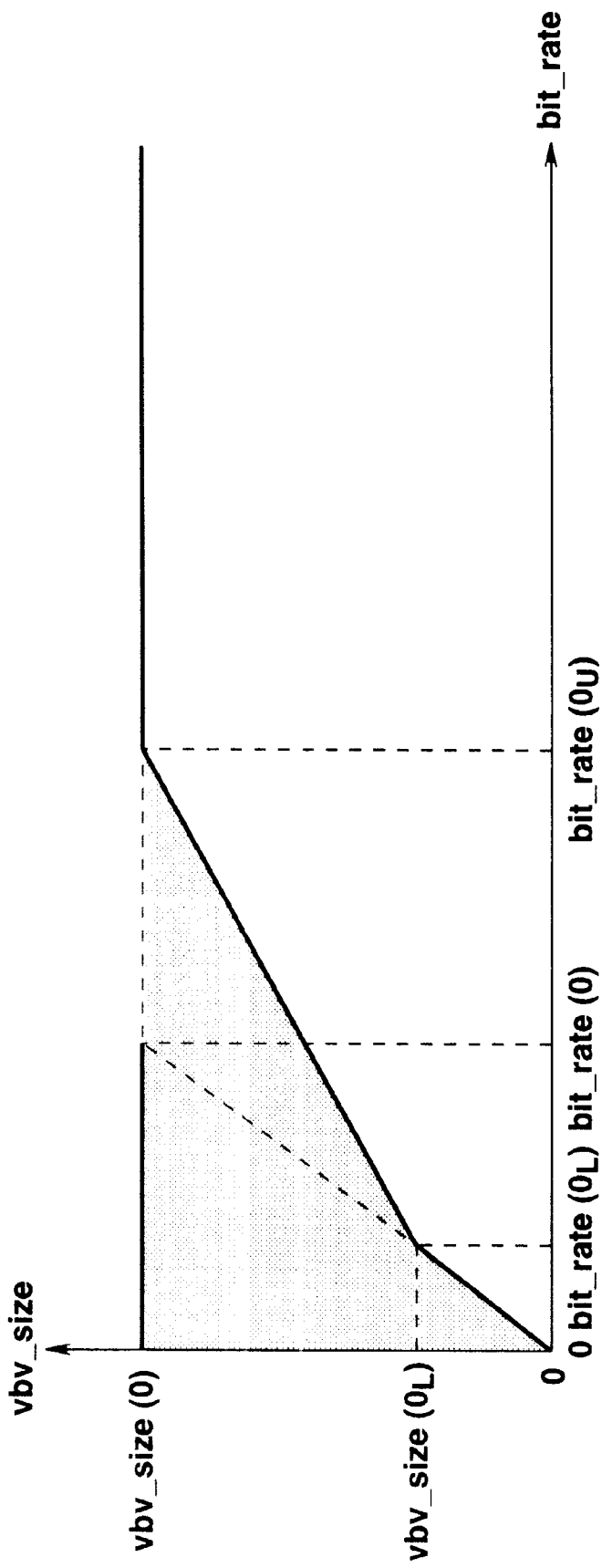
FIG. 28 illustrates the principle for restraining the reversal phenomenon of the bit quantity R.

Thus, a threshold value bit_rate($0_U$) greater than the threshold value bit_rate(0) and a threshold value bit_rate ($0_L$) smaller than the threshold value bit_rate(0) are set, as shown in FIG. 28. When the value of the bit rate bit_rate becomes smaller than the threshold value bit_rate($0_U$), the usable range of the VBV buffer is gradually restricted until the bit rate reaches the threshold value bit rate($0_L$). When the bit rate becomes smaller than the threshold value bit rate ($0_L$), the usable range of the VBV buffer can be abruptly restricted as in the case of FIG. 27. In this case, the first factor on the right side prescribing the usable range of the VBV buffer in the equation (13) at step S2 of Ad FIG. 6 is τmax×bit rate(j+1) when the bit rate is not higher than bit rate($0_L$). However, when the bit rate has a value between bit_rate($0_L$) and bit_rate($0_U$), the first factor may be changed to the following formula.

$$\{(vbv\_size(0)-vbv\_size(0_L))\times bit\_rate$$
$$+vbv\_size(0_L)\times bit\ rate(0_U)$$
$$-vbv\_size(0)\times vbv\_size(0_L)\}$$
$$/\{bit\_rate(0_U)-bit\_rate(0_L)\} \quad (36)$$

Meanwhile, vbv_size($0_L$) is expressed by the following equation.

$$vbv\_size(0_L)=vbv\_size(0)\times bit\_rate(0_L)/bit\_rate(0) \quad (37)$$

Figure 19:
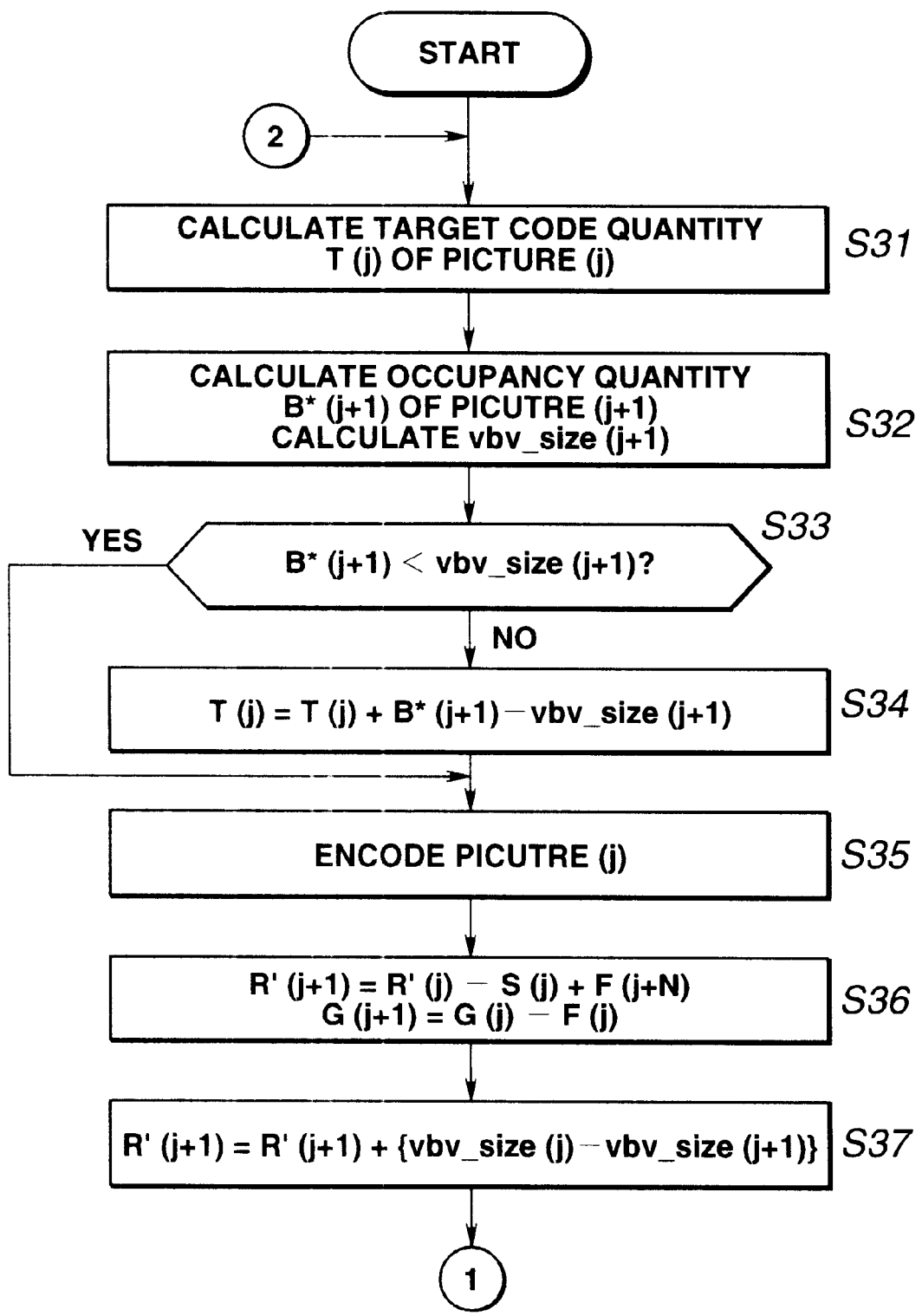
FIG. 19 is a flowchart for explaining the operation of the image coding device 2-1 of FIG. 18.
Figure 20:
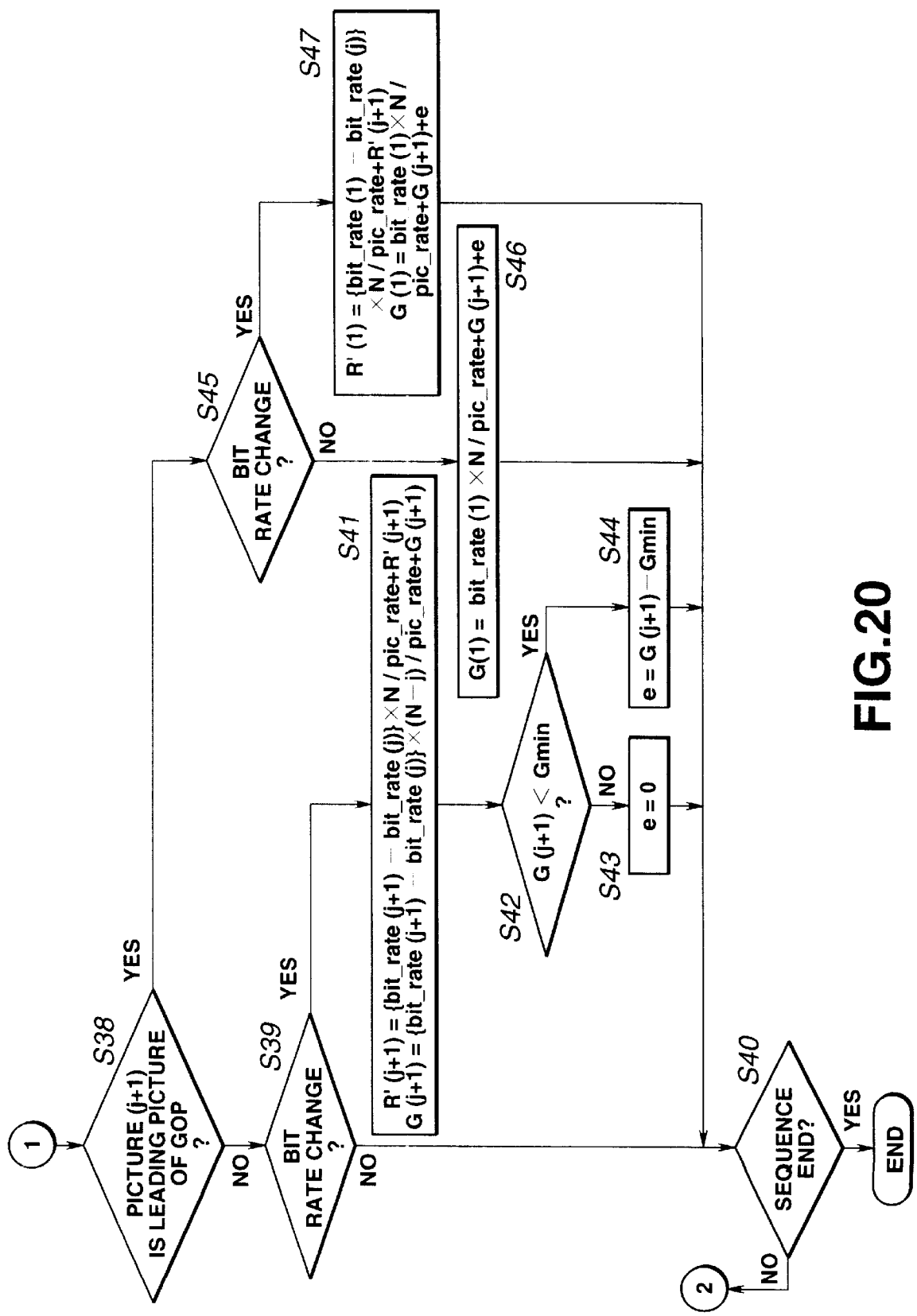
FIG. 20 is a flowchart for explaining the operation of the image coding device 2-1 of FIG. 18.

In the feed-forward bit rate control, too, the capacity of the VBV buffer is similarly calculated in accordance with the arithmetic operation of step S32 of FIG. 19.

Although the intra-AC calculation circuit 41 of FIG. 18 is adapted for calculating intra-AC, it may be adapted for calculating flatness instead of intra-AC. The flatness is data indicating spatial flatness of the image. In this case, a DCT block of 8×8 pixels is divided into subblocks each consisting of 2×2 pixels. Then, the difference between pixel data (pixel values) located on the diagonal in each subblock is calculated, and the smaller value of absolute values of difference is selected. The selected differential value is compared with a predetermined threshold, and the total number of subblocks having the differential value smaller than the threshold value is found as the flatness for each picture.

The value of flatness becomes smaller as the pattern of the image is spatially more complicated. The value of flatness becomes greater as the pattern of the image is spatially flatter. This flatness has strong negative correlation with the coding difficulty Di. Therefore, the coding difficulty Dj of a picture to be I-picture before compression coding can be found from the flatness and the target bit quantity T(j) for I-picture can be found from the flatness.

As described above, the bit rate can be changed at a halfway point in the GOP while the rate control method for a fixed bit rate is used. Therefore, the codes of the pattern quickly meet changes of the difficulty so as to change the bit rate. As a result, even when the phases of GOP of individual programs are not synchronized, the transmission capacity can be effectively used and the overall picture quality can be improved.

Also, by using the rate control method used for encoding at a fixed bit rate, rate control that can prevent underflow or overflow of the VBV buffer (or the buffer of the decoder) can be extended to statistical multiplexing.

This invention is not limited to statistical multiplexing, and can be applied to the case where the bit rate is seamlessly changed while the rate control method for fixed-rate coding is used in encoding data to be stored into a recording medium such has a hard disk. Thus, it is possible to change the bit rate in accordance with the picture pattern and hence to realize predetermined picture quality and saving of the capacity of the storage medium.

In the above-described embodiment, the target bit quantity is calculated on the GOP basis by using the TM5 algorithm. However, this invention is not limited to the embodiment and can be broadly applied to the case where the target bit quantity is calculated by calculating the bit quantity using a target transmission rate on the basis of a predetermined number of pictures as a unit from among pictures to be coded.

Also, in the above-described embodiment, the bit rate is changed on the picture basis by correcting the bit quantity R allocated to the remaining non-coded pictures. However, this invention is not limited to the embodiment and can be broadly applied to the case where the bit rate is changed on the GOP basis.

Moreover, in the above-described embodiment, each program is coded and transmitted in accordance with the MPEG system. However, this invention is not limited to the embodiment and can be broadly applied to the case where various programs are coded and transmitted by using various coding systems.

In the present specification, the system represents an entire device constituted by a plurality of devices and units.

As providing media for providing a computer program for carving out processing as described above to the user, communication media such as a network and a satellite as well as recording media such as a magnetic disk, a CD-ROM and a solid state memory can be used.

As described above, according to the present invention, when the designated bit rate is changed from the first bit rate to the second bit rate, the target bit quantity allocated to the coding target picture is corrected on the basis of the difference between the first bit rate and the second bit rate.

According to the present invention, in the case where the designated bit rate is changed from the first bit rate to the second bit rate at a halfway point in the GOP, the target bit quantity is corrected from the target bit quantity corresponding to the first bit rate to the target bit quantity corresponding to the second bit rate.

According to the present invention, in the case where the designated bit rate is changed from the first bit rate to the second bit rate at a halfway point in the GOP, the bit quantity of non-coded pictures is corrected so that the locus of change of the bit quantity of non-coded pictures becomes the locus at the time when each picture is coded at the second bit rate from the leading picture of the GOP, and the target bit quantity allocated to the coding target picture is calculated on the basis of the corrected bit quantity of non-coded pictures.

According to the present invention, in the case where the designated bit rate is changed from the first bit rate to the second bit rate at a halfway point in the GOP, the bit quantity of non-coded pictures is corrected from the bit quantity of non-coded pictures based on the first bit rate to the bit quantity of non-coded pictures based on the second bit rate, and the target bit quantity allocated to the coding target picture is calculated on the basis of the corrected bit quantity of non-coded pictures.

According to the present invention, in the case where the designated bit rate is changed from the first bit rate to the second bit rate at a halfway point in the GOP, the target bit quantity is corrected from the target bit quantity corresponding to the first bit rate to the target bit quantity corresponding to the second bit rate.

According to the present invention, in the case where the designated bit rate is changed from the first bit rate to the second bit rate at a halfway point in the GOP, the anticipated bit quantity allocated to non-coded pictures is corrected so that the locus of change of the anticipated bit quantity allocated to non-coded pictures becomes the locus at the time when each picture is coded at the second bit rate, and the target bit quantity allocated to the coding target picture is calculated on the basis of the corrected bit quantity.

According to the present invention, in the case where the designated bit rate is changed from the first bit rate to the second bit rate at a halfway point in the GOP, the bit quantity allocated non-coded pictures is corrected from the bit quantity of non-coded pictures based on the first bit rate to the bit quantity of non-coded pictures based on the second bit rate, and the target bit quantity allocated to the coding target picture is calculated on the basis of the corrected bit quantity of non-coded pictures.

According to the present invention, in the case where the designated bit rate is changed from the first bit rate to the second bit rate, the target bit quantity allocated to the coding target picture is corrected on the basis of the difference between the first bit rate and the second bit rate.

According to the present invention, in the case where the designated bit rate is changed from the first bit rate to the second bit rate at a halfway point in the GOP, the target bit quantity is corrected from the target bit quantity corresponding to the first bit rate to the target bit quantity corresponding to the second bit rate.

According to the present invention, in the case where the designated bit rate is changed from the first bit rate to the second bit rate at a halfway point in the GOP, the bit quantity of non-coded pictures is corrected so that the locus of change of the bit quantity of non-coded pictures becomes the locus at the time when each picture is coded at the second bit rate from the leading picture of the GOP, and the target bit quantity allocated to the coding target picture is calculated on the basis of the corrected bit quantity of non-coded pictures.

According to the present invention, in the case where the designated bit rate is changed from the first bit rate to the second bit rate at a halfway point in the GOP, the bit quantity of non-coded pictures is corrected from the bit quantity of non-coded pictures based on the first bit rate to the bit quantity of non-coded pictures based on the second bit rate, and the target bit quantity allocated to the coding target picture is calculated on the basis of the corrected bit quantity of non-coded pictures.

According to the present invention, in the case where the designated bit rate is changed from the first bit rate to the second bit rate at a halfway point in the GOP, the target bit quantity is corrected from the target bit quantity corresponding to the first bit rate to the target bit quantity corresponding to the second bit rate.

According to the present invention, in the case where the designated bit rate is changed from the first bit rate to the second bit rate at a halfway point in the GOP, the anticipated bit quantity allocated to non-coded pictures is corrected so that the locus of change of the anticipated bit quantity allocated to non-coded pictures becomes the locus at the time when each picture is coded at the second bit rate, and the target bit quantity allocated to the coding target picture is calculated on the basis of the corrected bit quantity.

According to the present invention, in the case where the designated bit rate is changed from the first bit rate to the second bit rate at a halfway point in the GOP, the bit quantity allocated non-coded pictures is corrected from the bit quantity of non-coded pictures based on the first bit rate to the bit quantity of-non-coded pictures based on the second bit rate, and the target bit quantity allocated to the coding target picture is calculated on the basis of the corrected bit quantity of non-coded pictures.

Thus, in any case, deterioration in transmission efficiency can be restrained even when there is discrepancy between phases of GOP at the time of statistical multiplexing of image data.

Description of Numerals

1 image multiplexing system; 2-1 to 2-n image coding device; 3 controller; 4 multiplexer; 11 picture rearrangement circuit; 12 scan conversion macroblock forming circuit; 13 subtracter; 14 dct circuit; 15 quantization circuit; 16 variable-th coding circuit; 17 buffer memory; 18 inverse quantization circuit; 19 inverse circuit; 20 adder; 21 motion detection circuit; 22 motion compensation circuit; rate controller; 24 controller; 31 complexity calculation circuit; 32 target bit quantity setting circuit; 33 quantizer scale code determination circuit

What is claimed is:

1. A coding device for coding video data on the basis of a designated bit rate, the device comprising:

control means for calculating a target bit quantity allocated to each picture included in a GOP on the basis of the designated bit rate; and coding means for coding a coding target picture on the basis of the target bit quantity controlled by the control means, the control means correcting the target bit quantity allocated to the coding target picture on the basis of the difference between a first bit rate and a second bit rate when the designated bit rate is changed from the first bit rate to the second bit rate in the case where coding processing of the coding target picture is carried out by the coding means.

2. The coding device as claimed in claim 1, wherein the control means finds the target bit quantity allocated to the coding target picture by distributing a bit quantity allocated to non-coded pictures that have not been coded in the target GOP in accordance with the picture type of the coding target picture.

3. The coding device as claimed in claim 2, wherein the control means corrects the bit quantity of non-coded pictures in accordance with the difference between the first bit rate and the second bit rate, and calculates the target bit quantity of the coding target picture on the basis of the corrected bit quantity of non-coded pictures.

4. The coding device as claimed in claim 2, wherein the control means corrects the bit quantity of non-coded pictures by using a value obtained by multiplying the difference between a bit quantity per picture at the first bit rate and a bit quantity per picture at the second bit rate by the number of non-coded pictures, and calculates the target bit quantity of the coding target picture on the basis of the corrected bit quantity of non-coded pictures.

5. The coding device as claimed in claim 4, wherein an algorithm for calculating the target bit quantity of the coding target picture is a feedback-type arithmetic algorithm for calculating global complexity indicating complexity of a screen on the basis of the quantity of generated bits generated as a result of coding processing of each picture by the coding means, and calculating the target bit quantity of the coding target picture on the basis of the global complexity and the bit quantity of non-coded pictures.

6. The coding device as claimed in claim 4, wherein in coding pictures up to a picture immediately before the coding target picture at the first bit rate and coding pictures from the coding target picture at the second bit rate, the control means finds the bit quantity of non-coded pictures at and after the coding target picture by subtracting the quantity of generated bits generated by coding processing of the picture immediately before the coding target picture from the bit quantity allocated to the non-coded pictures at and after the picture immediately before the coding target picture.

7. The coding device as claimed in claim 6, wherein in the case where a leading picture of a GOP next to the target GOP is coded after coding pictures up to the picture immediately before the coding target picture at the first bit rate and coding pictures from the coding target picture at the second bit rate, the control means corrects the bit quantity allocated to non-coded pictures of the next GOP by using a correction value generated as a result of coding processing of the target GOP.

8. The coding device as claimed in claim 1, wherein in coding a coding target picture (j+1) as a (j+1)th picture in the GOP, a bit quantity R(j+1) allocated to non-coded pictures including the coding target picture (j+1) in the target GOP is calculated in accordance with the following equation, $$R(j+1)=R(j)-S(j)$$

and wherein a target bit quantity allocated to the coding target picture (j+1) is calculated on the basis of the bit quantity R(j+1) allocated to the non-coded pictures.

9. The coding device as claimed in claim 8, wherein in the case where the coding target picture (j+1) is the first picture of the GOP, the bit quantity R(j+1) of the non-coded pictures at and after the coding target picture (j+1) in the GOP including the coding target picture (j+1) is calculated in accordance with the following equation, $$R(j+1)=bit\_rate(j+1) \times N/pic\_rate+R(j+1)+e$$

where bit_rate expresses the bit rate designated to the target GOP including the picture (j+1), N expresses the number of pictures included in the GOP, pic_rate expresses the frame rate, R(j+1) expresses a value obtained by subtracting the bit quantity generated by coding processing of the picture (j) from the bit quantity R(j) of the non-coded pictures at and after the picture (j) in the GOP including the picture (j) preceding the coding target picture (j+1), and e expresses the correction bit quantity supplied to the GOP next to the GOP including the coding target picture (j+1).

10. The coding device as claimed in claim 8, wherein in the case where the coding target picture (j+1) is a picture at a halfway point in the target GOP, and where pictures up to the picture (j) preceding the coding target picture are coded at the first bit rate and pictures from the coding target picture (j+1) are coded at the second bit rate, the bit quantity of the non-coded pictures at and after the picture (j+1) in the GOP including the coding target picture (j+1) is calculated in accordance with the following equation, $$R(j+1)=(bit\_rate(j+1)-bit\_rate(j)) \times (N-j)/pic\_rate+R(j+1)$$

where bit_rate(j) expresses the first bit rate, bit_rate(j+1) expresses the second bit rate, N expresses the number of pictures included in the GOP, pic_rate expresses the frame rate, and R(j+1) expresses a value obtained by subtracting the bit quantity generated by coding processing of the picture (j) from the bit quantity R(j) of the non-coded pictures at and after the picture (j) in the GOP including the picture (j) preceding the coding target picture (j+1).

11. The coding device as claimed in claim 10, wherein the target bit quantity T(j+1) allocated to the coding target picture (j+1) is calculated in accordance with the following equations, $$Ti(j+1)=\max\ (R(j+1)/(1+NpXp/XiKp+NbXb/XiKb),$$
$$bit\_rate/8 \times pic\_rate)$$
$$Tp(j+1)=\max\ (R(j+1)/(Np+NbKpXb/KbXp),\ bit\_rate/8 \times pic\_rate)$$
$$Tb(j+1)=\max\ (R(j+1)/(Nb+NpKbXp/KpXb),\ bit\_rate/8 \times pic\_rate)$$

where Ti(j+1) expresses the target bit quantity in the case where the coding target picture (j+1) is I-picture, Tp(j+1) expresses the target bit quantity in the case where the coding target picture (j+1) is P-picture, Tb(j+1) expresses the target bit quantity in the case where the coding target picture (j+1) is B-picture, R(j+1) expresses the bit quantity allocated to the non-coded pictures at and after the picture (j+1) in the GOP including the target picture (j+1), Xi expresses global complexity indicating complexity of a screen of I-picture, Xp expresses global complexity indicating complexity of a screen of P-picture, Xb expresses global complexity indicating complexity of a screen of B-picture, Np expresses the number of non-coded P-pictures in the GOP including the coding target picture (j+1), Nb expresses the number of non-coded B-pictures in the GOP including the coding target picture (j+1), Kp expresses the ratio of a quantizer scale code of P-picture with reference to a quantizer scale code of I-picture, and Kb expresses the ratio of a quantizer scale code of B-picture with reference to the quantizer scale code of I-picture.

12. The coding device as claimed in claim 1, wherein in coding pictures up to a picture immediately before the coding target picture at the first bit rate and coding pictures from the coding target picture at the second bit rate, the control means calculates the bit quantity allocated to a predetermined number of non-coded pictures at and after the coding target picture and detects difficulty indicating coding difficulty of the predetermined number of non-coded pictures, and finds the target bit quantity allocated to the coding target picture by distributing the bit quantity of the predetermined number of non-coded pictures on the basis of the difficulty of the coding target picture.

13. The coding device as claimed in claim 12, wherein control means corrects the bit quantity of the predetermined number of non-coded pictures in accordance with the difference between the first bit rate and the second bit rate, and calculates the target bit quantity of the coding target picture on the basis of the corrected bit quantity of the predetermined number of non-coded pictures.

14. The coding device as claimed in claim 12, wherein the control means corrects the bit quantity of the predetermined number of non-coded pictures by using a value obtained by multiplying the difference between a bit quantity per picture at the first bit rate and a bit quantity per picture at the second bit rate by the predetermined number of non-coded pictures, and calculates the target bit quantity of the coding target picture on the basis of the corrected bit quantity of the predetermined number of non-coded pictures.

15. The coding device as claimed in claim 13, wherein every time a picture is coded, the control means finds the bit quantity allocated to non-coded pictures up to a picture which is ahead of the coding target picture by a predetermined number of pictures, on the basis of a bit quantity generated as a result of coding processing of a picture immediately before the coding target picture and an anticipated quantity of generated bits of the picture which is ahead of the coding target picture by the predetermined number of pictures.

16. The coding device as claimed in claim 15, wherein the anticipated quantity of generated bits of the picture which is ahead of the coding target picture by the predetermined number of pictures is found by distributing the bit quantity allocated to non-coded pictures at and after the picture which is ahead by the predetermined number of pictures in the GOP including the picture which is ahead by the predetermined number of pictures, in accordance with the picture type of the picture which is ahead by the predetermined number of pictures.

17. The coding device as claimed in claim 16, wherein the bit quantity allocated to non-coded pictures at and after the picture which is ahead by the predetermined number of pictures is corrected by using a value obtained by multiplying the difference between a bit quantity per picture at the first bit rate and a bit quantity per picture at the second bit rate by the number of non-coded pictures at and after the picture which is ahead by the predetermined number of pictures in the GOP including the picture which is ahead by the predetermined number of pictures.

18. The coding device as claimed in claim 17, wherein in the case where a leading picture of a next GOP is coded after coding pictures up to a picture immediately before the coding target picture at the first bit rate and coding pictures from the coding target picture at the second bit rate, the control means corrects the bit quantity allocated to non-coded pictures of the next GOP by using a correction value generated as a result of coding processing of the GOP including the coding target picture.

19. The coding device as claimed in claim 18, wherein the correction value is obtained by using a value obtained by subtracting the quantity of generated bits generated by actual coding processing of the last picture of the GOP including the coding target picture from the target bit quantity allocated to the last picture.

20. The coding device as claimed in claim 12, wherein an algorithm for calculating the target bit quantity of the coding target picture in the control means is a feed-forward type algorithm for detecting difficulty indicating coding difficulty of a predetermined number of non-coded pictures including the coding target picture, and calculating the target bit quantity of the coding target picture on the basis of the difficulty of the predetermined number of non-coded pictures and the difficulty of the coding target picture, before coding processing of the coding target picture.

21. The coding device as claimed in claim 1, wherein in coding a coding target picture (j+1) as a (j+1)th picture in the GOP, a bit quantity R'(j+1) allocated to L non-coded pictures from the coding target picture (j+1) to a picture (j+L) is calculated in accordance with the following equation, $$R'(j+1)=R'(j)-S(j)+F(j+L)$$

where R'(j) expresses the bit quantity allocated to L non-coded pictures from a picture (j) to a picture (j−1+L), S(j) expresses the bit quantity generated as a result of coding processing of the picture (j), and F(j+L) expresses an anticipated quantity of generated bits of the picture (j+L).

22. The coding device as claimed in claim 21, wherein the anticipated quantity of generated bits F(j+L) of the picture (j+L) is calculated in accordance with the following equations, $$Fi(j+L)=\max(G(j+L)/(1+NpXp/XiKp+NbXb/XiKb),$$
$$\text{bit\_rate}/8\times\text{pic\_rate})$$

$$Fp(j+L)=\max(G(j+L)/(Np+NbKpXb/KbXp), \text{bit\_rate}/8\times\text{pic rate})$$

$$Fb(j+L)=\max(G(j+L)/(Nb+NpKbXp/KpXb), \text{bit\_rate}/8\times\text{pic-rate})$$

where Fi(j+L) expresses the target bit quantity in the case where the picture (j+L) is I-picture, Fp(j+L) expresses the target bit quantity in the case where the picture (j+L) is P-picture, Fb(j+L) expresses the target bit quantity in the case where the picture (j+L) is B-picture, G(j+L) expresses the bit quantity allocated to the non-coded pictures at and after the picture (j+L) in the GOP including the picture (j+L), Xi expresses global complexity indicating complexity of a screen of I-picture, Xp expresses global complexity indicating complexity of a screen of P-picture, Xb expresses global complexity indicating complexity of a screen of B-picture, Np expresses the number of non-coded P-pictures in the GOP including the picture (j+L), Nb expresses the number of non-coded B-pictures in the GOP including the picture (j+L), Kp expresses the ratio of a quantizer scale code of P-picture with reference to a quantizer scale code of I-picture, and Kb expresses the ratio of a quantizer scale code of B-picture with reference to the quantizer scale code of I-picture.

23. The coding device as claimed in claim 22, wherein the bit quantity G(j+L) allocated to non-coded pictures at and after the picture (j+L) in the GOP including the picture (j+L) is found in accordance with the following equation, $$G(j+L)=G(j+L-1)-F(j+L-1)$$

where G(j+L−1) expresses the bit quantity allocated to non-coded pictures at and after a picture (j+L−1) in the GOP including the picture (j+L), and F(j+L−1) expresses an anticipated quantity of generated bits of the picture (j+L−1).

24. The coding device as claimed in claim 23, wherein in the case where the coding target picture (j+1) is the first picture of the GOP and the designated bit rate is changed from the first bit rate to the second bit rate in a GOP which is temporally preceding the GOP including the coding target picture (j+1), the bit quantity R'(j+1) of L non-coded pictures at and after the coding target picture (j+1) and the bit quantity G(j+1) of L non-coded pictures at and after the coding target picture (j+1) in the GOP including the coding target picture (j+1) are found in accordance with the following equations, $$R'(j+1)=(\text{bit\_rate}(2)-\text{bit\_rate}(1))\times L/\text{pic\_rate}+R'(j+1)$$

$$G(j+1)=\text{bit\_rate}(2)\times N/\text{pic\_rate}+G(j+1)+e$$

where bit rate(1) expresses the first bit rate, bit_rate(2) expresses the second bit rate, N expresses the number of pictures included in the GOP, pic_rate expresses the frame rate, G(j+1) expresses the remaining bit quantity as a result of coding processing of the last picture of the GOP including the picture (j), and e expresses the correction bit quantity supplied to a GOP next to the GOP including the picture (j+1).

25. The coding device as claimed in claim 23, wherein in the case where the coding target picture (j+1) is a picture at a halfway point in the GOP and where pictures up to the picture (j) are coded at the first bit rate and pictures from the picture (j+1) are coded at the second bit rate, the bit quantity R'(j+1) of L non-coded pictures at and after the coding target picture (j+1) and the bit quantity G(j+1) of L non-coded pictures at and after the coding target picture (j+1) in the GOP including the coding target picture (j+1) are found in accordance with the following equations, $$R'(j+1)=(\text{bit\_rate}(j+1)-\text{bit\_rate}(j))\times L/\text{pic\_rate}+R'(j+1)$$

$$G(j+1)=(\text{bit\_rate}(j+1)-\text{bit\_rate}(j))\times N/\text{pic\_rate}+G(j+1)+e$$

where bit_rate(j) expresses the first bit rate designated to the GOP including the picture (j), bit_rate(j+1) expresses the second bit rate designated to the GOP including the picture (j+1), N expresses the number of pictures included in the GOP, pic_rate expresses the frame rate, G(j+1) expresses the remaining bit quantity as a result of coding processing of the last picture of the GOP including the picture (j), and e expresses the correction bit quantity supplied to a GOP next to the GOP including the picture (j+1).

26. The coding device as claimed in claim 25, wherein a target bit quantity T(j+1) allocated to the coding target picture (j+1) is calculated in accordance with the following equation, $$T(j+1)=\max(R'(j+1)\times D(j+1)/\Sigma D(k), \text{bit\_rate}(j+1)/8\times\text{pic\_rate})$$

where D(j+1) expresses difficulty of the coding target picture (j+1), and

ΣD(k) expresses a value obtained by adding difficulty of pictures from the picture (j+1) to the picture (j+1+L).

27. A coding device for coding video data on the basis of a designated bit rate, the device comprising:

control means for calculating a target bit quantity allocated to a coding target picture on the basis of a bit quantity allocated to non-coded pictures in a GOP and the designated bit rate; and coding means for coding the coding target picture in accordance with the target bit quantity calculated by the control means;

the control means correcting the target bit quantity provided to the coding means from a target bit quantity corresponding to a first bit rate to a target bit quantity corresponding to a second bit rate in the case where the designated bit rate is changed from the first bit rate to the second bit rate at a halfway point in the GOP.

28. A coding device for coding video data on the basis of a designated bit rate, the device comprising:

control means for calculating a target bit quantity allocated to a coding target picture from a bit quantity allocated to non-coded pictures in a GOP; and coding means for coding the coding target picture in accordance with the target bit quantity calculated by the control means;

the control means correcting the bit quantity of non-coded pictures so that the locus of change of the bit quantity of non-coded pictures becomes the locus at the time when each picture is coded at a second bit rate from a leading picture of the GOP, in the case where the designated bit rate is changed from a first bit rate to the second bit rate at a halfway point in the GOP, the control means calculating the target bit quantity allocated to the coding target picture on the basis of the corrected bit quantity of non-coded pictures.

29. A coding device for coding video data on the basis of a designated bit rate, the device comprising:

control means for calculating a target bit quantity allocated to a coding target picture from a bit quantity allocated to non-coded pictures in a GOP; and coding means for coding the coding target picture in accordance with the target bit quantity calculated by the control means;

the control means correcting the bit quantity of non-coded pictures from a bit quantity of non-coded pictures based on a first bit rate to a bit quantity of non-coded pictures based on a second bit rate in the case where the designated bit rate is changed from the first bit rate to the second bit rate at a halfway point in the GOP, the control means calculating the target bit quantity allocated to the coding target picture on the basis of the corrected bit quantity of non-coded pictures.

30. A coding device for coding video data on the basis of a designated bit rate, the device comprising:

control means for calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and coding means for coding the coding target picture in accordance with the target bit quantity calculated by the control means;

the control means correcting the target bit quantity provided to the coding means from a target bit quantity corresponding to a first bit rate to a target bit quantity corresponding to a second bit rate in the case where the designated bit rate is changed from the first bit rate to the second bit rate at a halfway point in a GOP.

31. A coding device for coding video data on the basis of a designated bit rate, the device comprising:

control means for calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and coding means for coding the coding target picture in accordance with the target bit quantity calculated by the control means;

the control means correcting the anticipated bit quantity allocated to non-coded pictures so that the locus of change of the anticipated bit quantity allocated to non-coded pictures becomes the locus at the time when each picture is coded at a second bit rate, in the case where the designated bit rate is changed from a first bit rate to the second bit rate at a halfway point in a GOP, the control means calculating the target bit quantity allocated to the coding target picture on the basis of the corrected bit quantity.

32. A coding device for coding video data on the basis of a designated bit rate, the device comprising:

control means for calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and coding means for coding the coding target picture in accordance with the target bit quantity calculated by the control means;

the control means correcting the bit quantity allocated non-coded pictures from a bit quantity of non-coded pictures based on a first bit rate to a bit quantity of non-coded pictures based on a second bit rate in the case where the designated bit rate is changed from the first bit rate to the second bit rate at a halfway point in a GOP, the control means calculating the target bit quantity allocated to the coding target picture on the basis of the corrected bit quantity of non-coded pictures.

33. A coding method for coding video data on the basis of a designated bit rate, the method comprising:

a control step of calculating a target bit quantity allocated to each picture included in a GOP on the basis of the designated bit rate; and a coding step of coding a coding target picture on the basis of the target bit quantity controlled by the control step;

wherein at the control step, when the designated bit rate is changed from a first bit rate to a second bit rate in the case where coding processing of the coding target picture is carried out by the coding step, the target bit quantity allocated to-the coding target picture is corrected on the basis of the difference between the first bit rate and the second bit rate.

34. A coding method for coding video data on the basis of a designated bit rate, the method comprising:

a control step of calculating a target bit quantity allocated to a coding target picture on the basis of a bit quantity allocated to non-coded pictures in a GOP and the designated bit rate; and a coding step of coding the coding target picture in accordance with the target bit quantity calculated by the control step;

wherein at the control step, in the case where the designated bit rate is changed from a first bit rate to a second bit rate at a halfway point in the GOP, the target bit quantity provided to the coding step is corrected from a target bit quantity corresponding to the first bit rate to a target bit quantity corresponding to the second bit rate.

35. A coding method for coding video data on the basis of a designated bit rate, the method comprising:

a control step of calculating a target bit quantity allocated to a coding target picture from a bit quantity allocated to non-coded pictures in a GOP; and a coding step of coding the coding target picture in accordance with the target bit quantity calculated by the control step;

wherein at the control step, in the case where the designated bit rate is changed f rom a first bit rate to a second bit rate at a halfway point in the GOP, the bit quantity of non-coded pictures is corrected so that the locus of change of the bit quantity of non-coded pictures becomes the locus at the time when each picture is coded at the second bit rate from a leading picture of the GOP, and the target bit quantity allocated to the coding target picture is calculated on the basis of the corrected bit quantity of non-coded pictures.

36. A coding method for coding video data on the basis of a designated bit rate, the method comprising:

a control step of calculating a target bit quantity allocated to a coding target picture from a bit quantity allocated to non-coded pictures in a GOP; and a coding step of coding the coding target picture in accordance with the target bit quantity calculated by the control step;

wherein at the control step, in the case where the designated bit rate is changed from a first bit rate to a second bit rate at a halfway point in the GOP, the bit quantity of non-coded pictures is corrected from a bit quantity of non-coded pictures based on the first bit rate to a bit quantity of non-coded pictures based on the second bit rate, and the target bit quantity allocated to the coding target picture is calculated on the basis of the corrected bit quantity of non-coded pictures.

37. A coding method for coding video data on the basis of a designated bit rate, the method comprising:

a control step of calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and a coding step of coding the coding target picture in accordance with the target bit quantity calculated by the control step;

wherein at the control step, in the case where the designated bit rate is changed from a first bit rate to a second bit rate at a halfway point in a GOP, the target bit quantity provided to the coding step is corrected from a target bit quantity corresponding to the first bit rate to a target bit quantity corresponding to the second bit rate.

38. A coding method for coding video data on the basis of a designated bit rate, the method comprising:

a control step of calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and a coding step of coding the coding target picture in accordance with the target bit quantity calculated by the control step;

wherein at the control step, in the case where the designated bit rate is changed from a first bit rate to a second bit rate at a halfway point in a GOP, the anticipated bit quantity allocated to non-coded pictures is corrected so that the locus of change of the anticipated bit quantity allocated to non-coded pictures becomes the locus at the time when each picture is coded at the second bit rate, and the target bit quantity allocated to the coding target picture is calculated on the basis of the corrected bit quantity.

39. A coding method for coding video data on the basis of a designated bit rate, the method comprising:

a control step of calculating an anticipated bit quantity allocated to non-coded pictures up to a picture which is ahead of a coding target picture by a predetermined number of pictures and distributing the anticipated bit quantity on the basis of coding difficulty of the coding target picture so as to calculate a target bit quantity allocated to the coding target picture; and a coding step of coding the coding target picture in accordance with the target bit quantity calculated by the control step;

wherein at the control step, in the case where the designated bit rate is changed from a first bit rate to a second bit rate at a halfway point in a GOP, the bit quantity allocated non-coded pictures from a bit quantity of non-coded pictures based on the first bit rate to a bit quantity of non-coded pictures based on the second bit rate, and the target bit quantity allocated to the coding target picture is calculated on the basis of the corrected bit quantity of non-coded pictures.

* * * * *